Aug. 6, 1940.　　　I. C. MARTIN ET AL　　　2,209,987
CABINET TYPE ACTUATOR GOVERNOR
Filed Sept. 20, 1937　　14 Sheets-Sheet 1

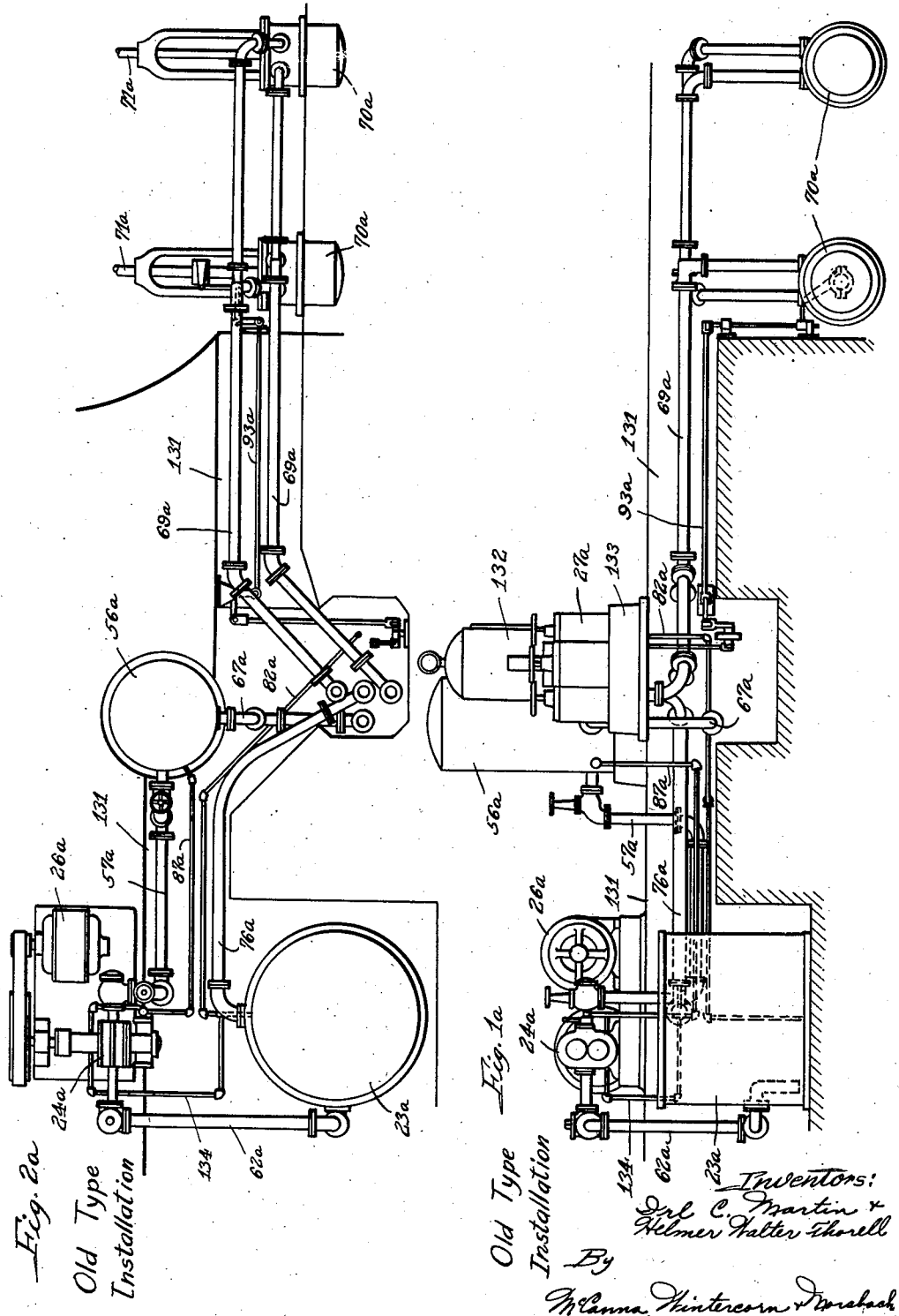

Aug. 6, 1940.　　　　I. C. MARTIN ET AL　　　　2,209,987
CABINET TYPE ACTUATOR GOVERNOR
Filed Sept. 20, 1937　　　14 Sheets-Sheet 3

Inventors:
Irl C. Martin &
Helmer Walter Thorell
By
McCanna, Wintercorn & Morsbach
Attys

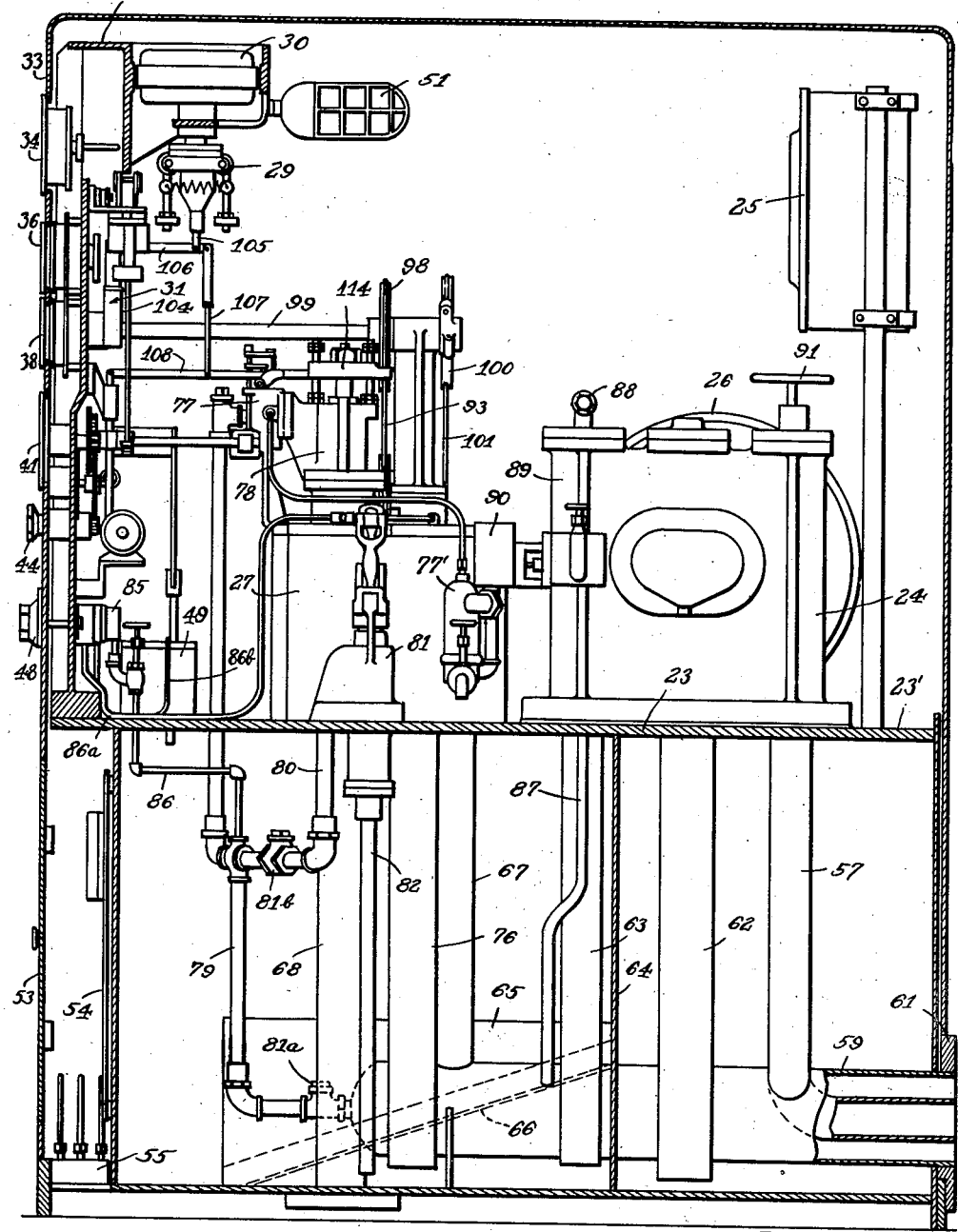

Aug. 6, 1940.    I. C. MARTIN ET AL    2,209,987
CABINET TYPE ACTUATOR GOVERNOR
Filed Sept. 20, 1937    14 Sheets-Sheet 5
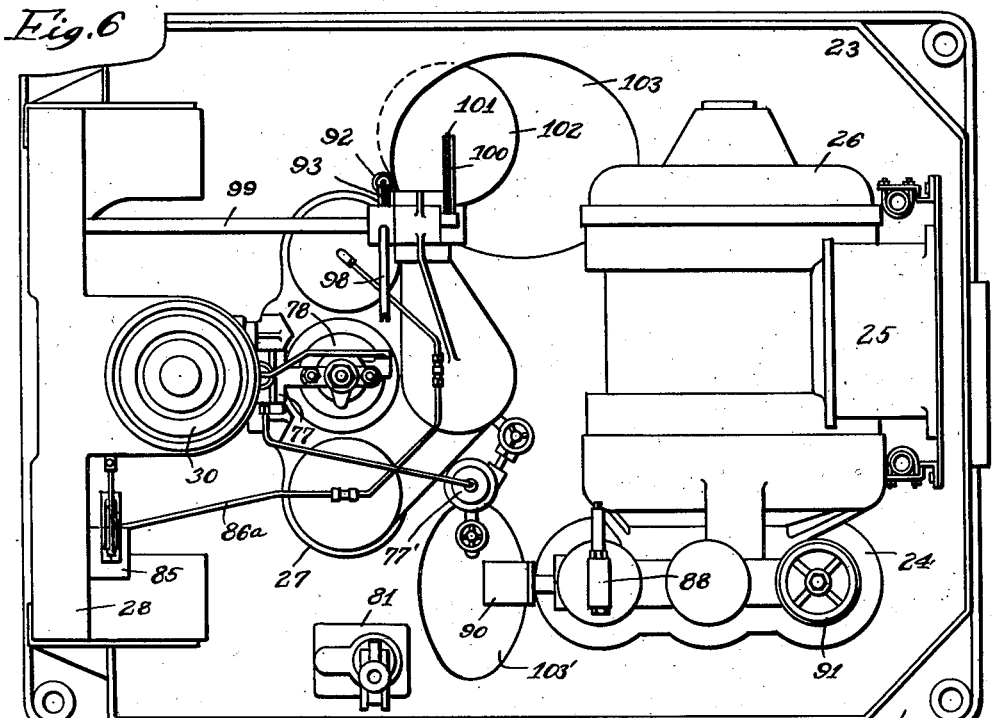
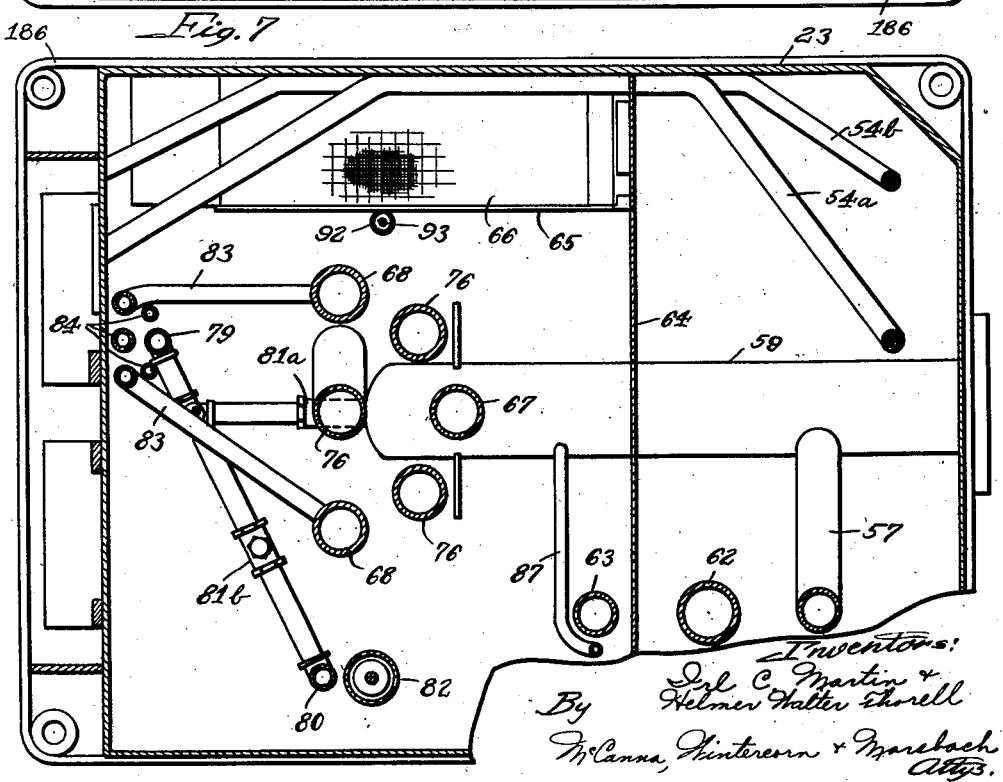

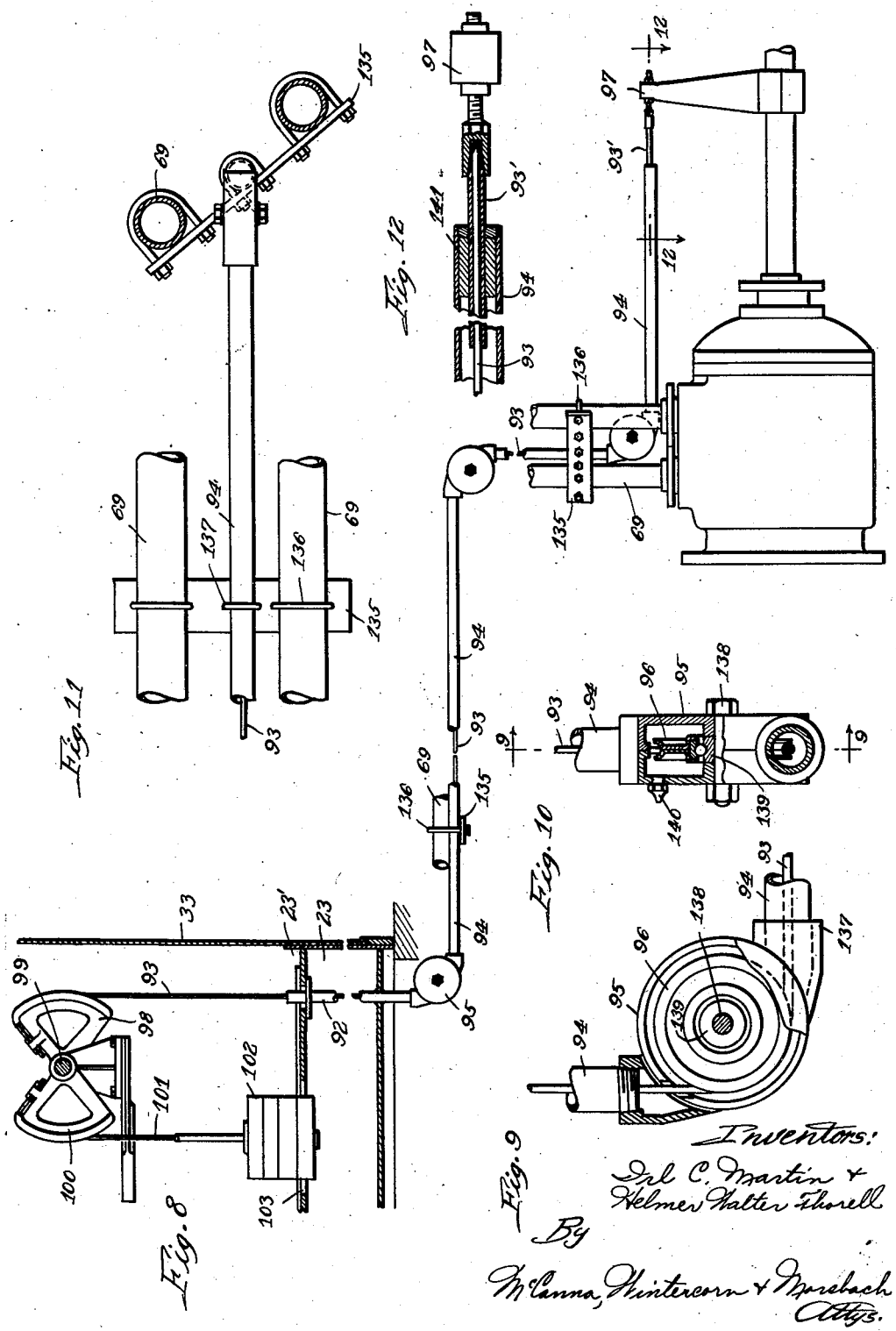

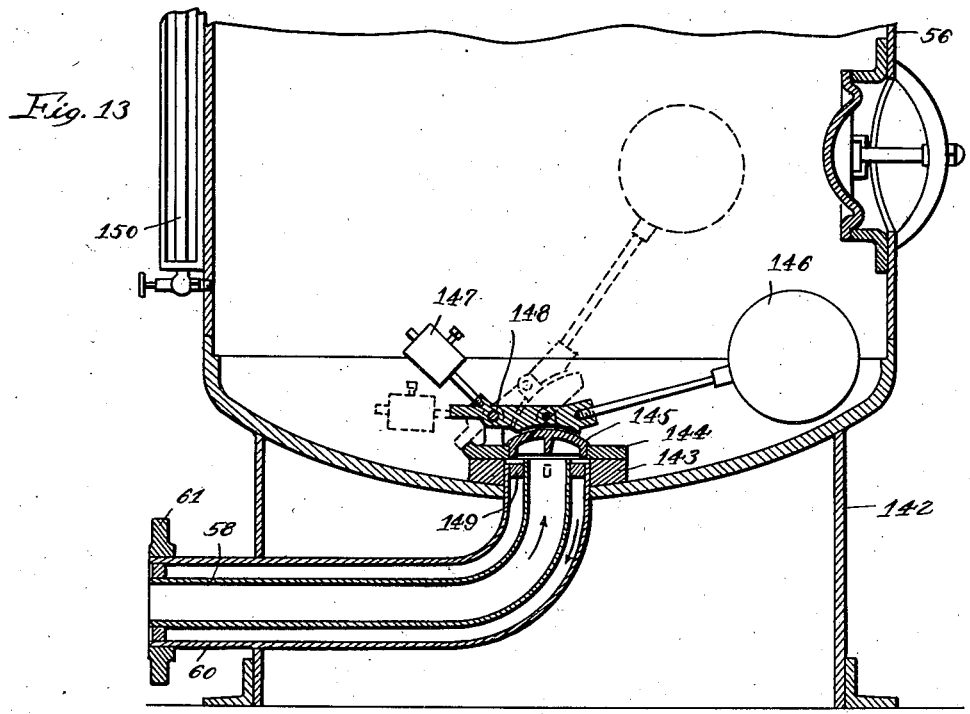
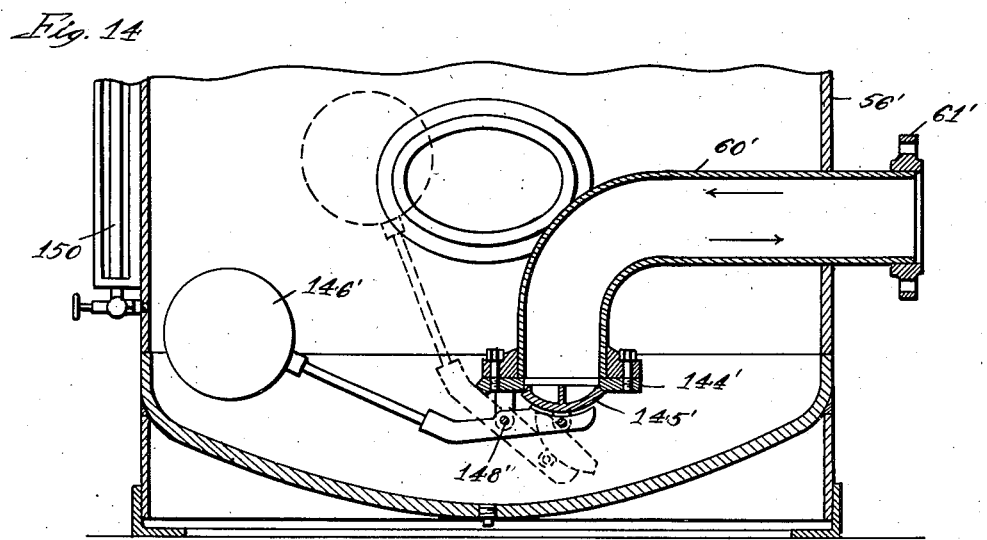

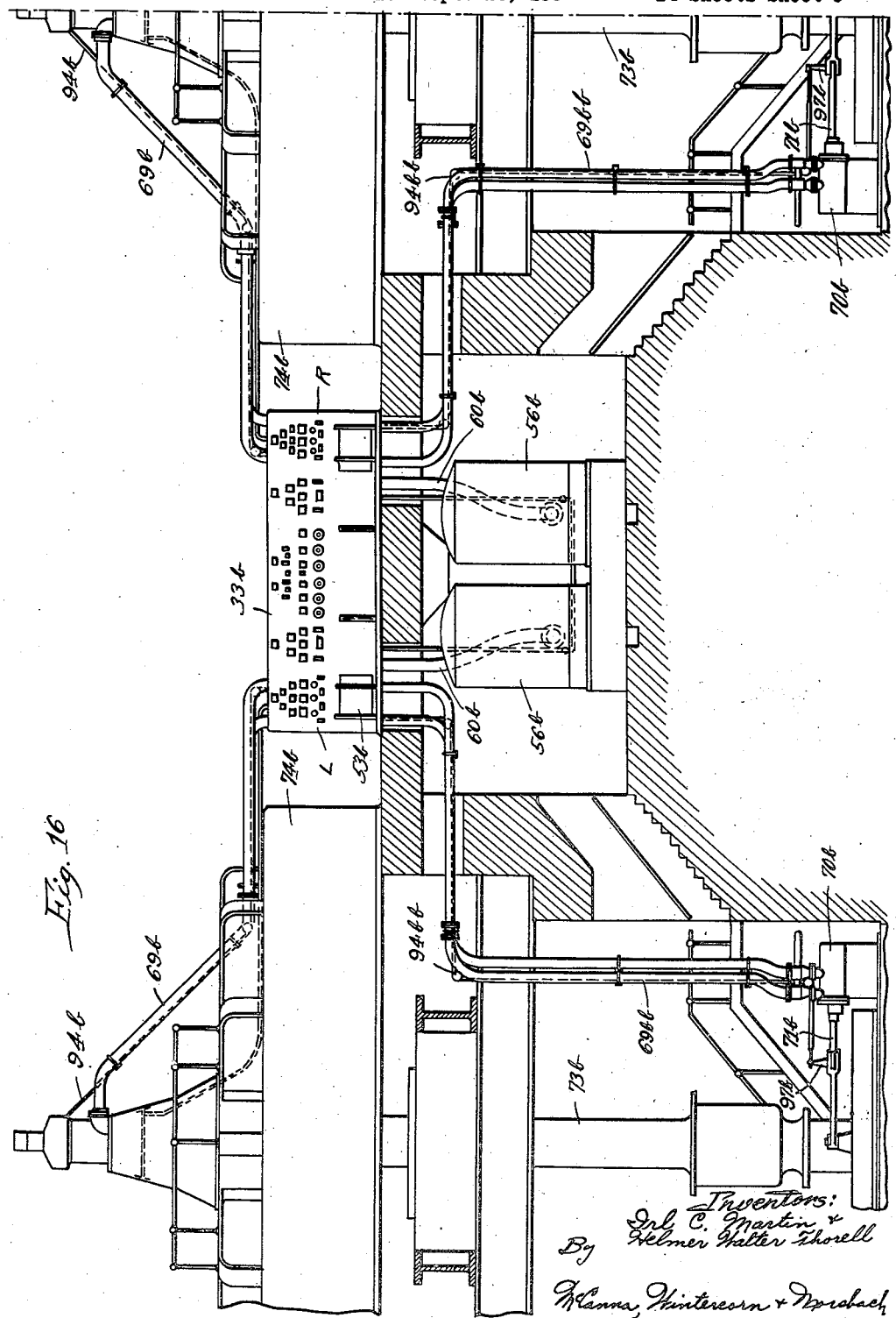

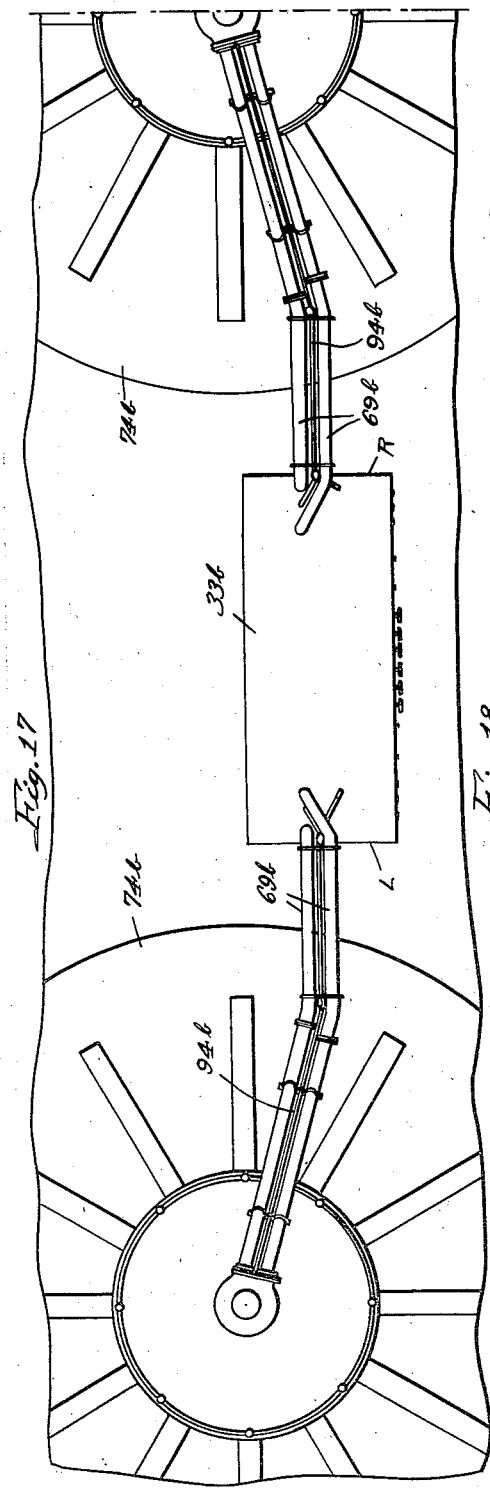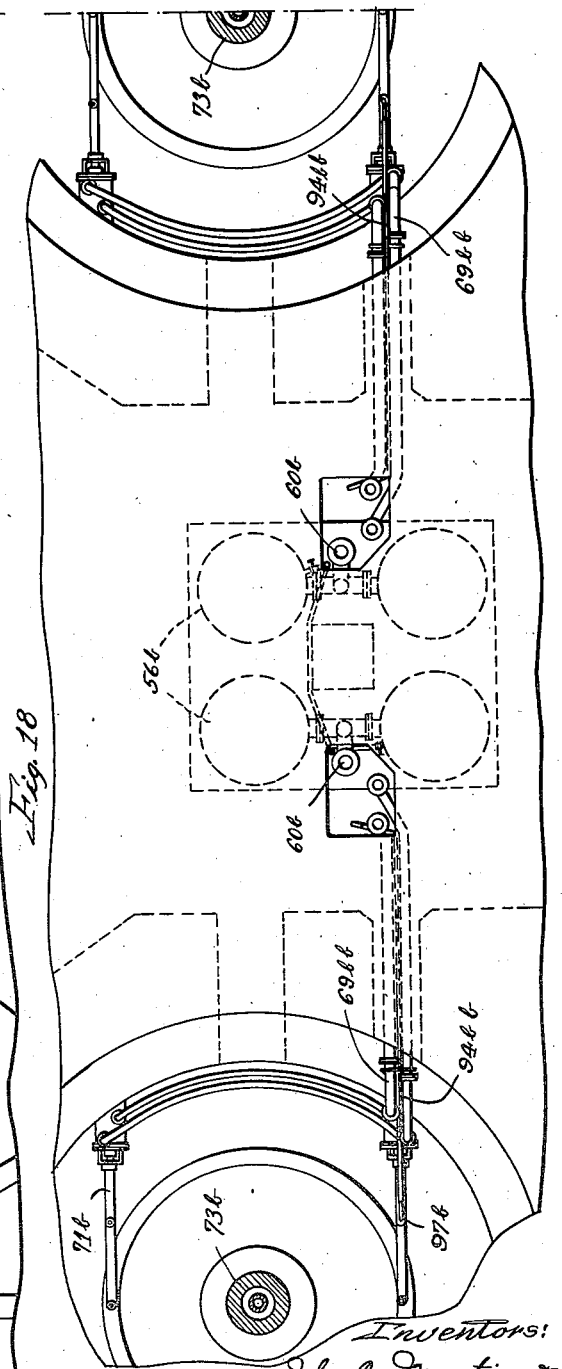

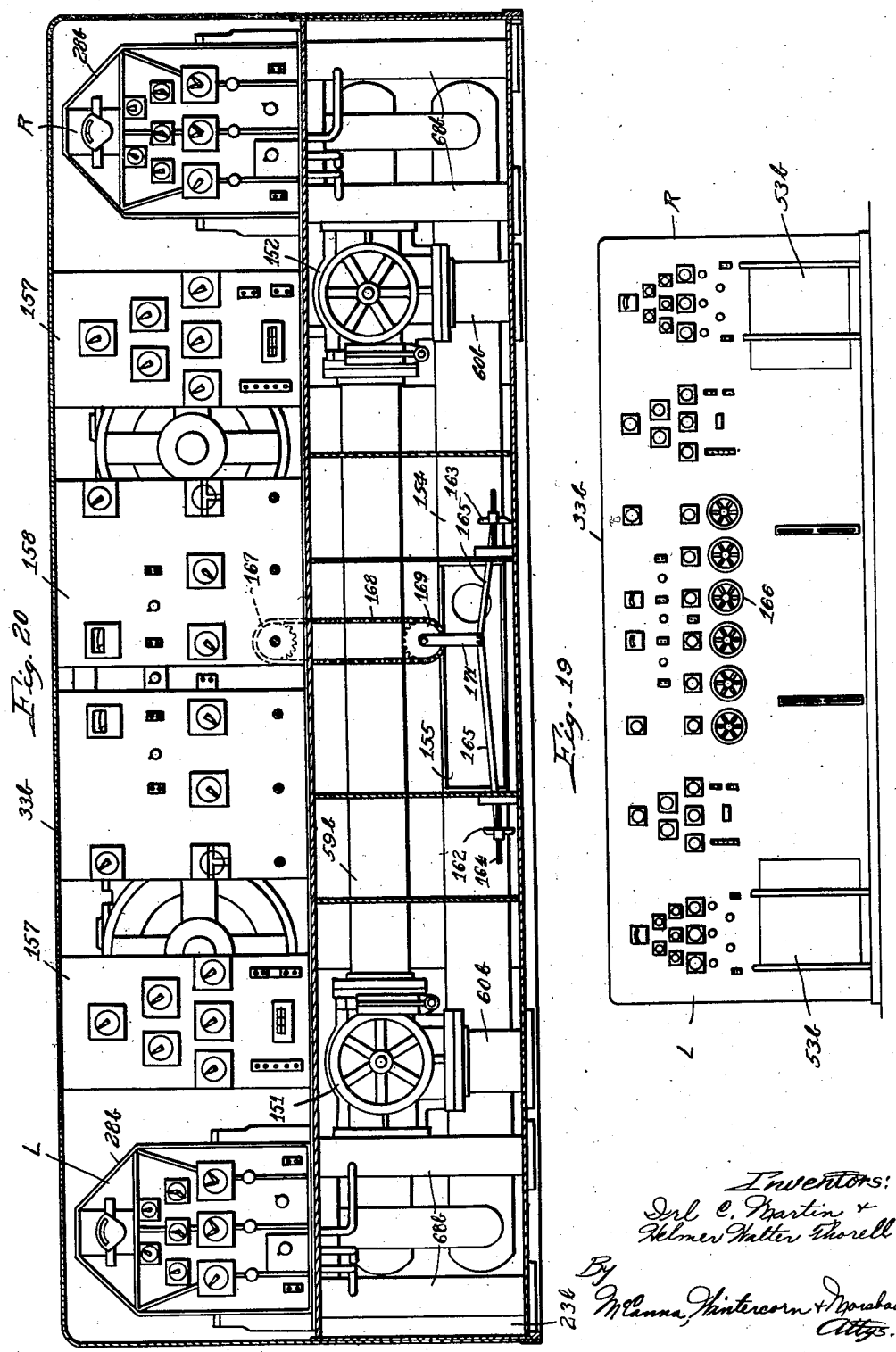

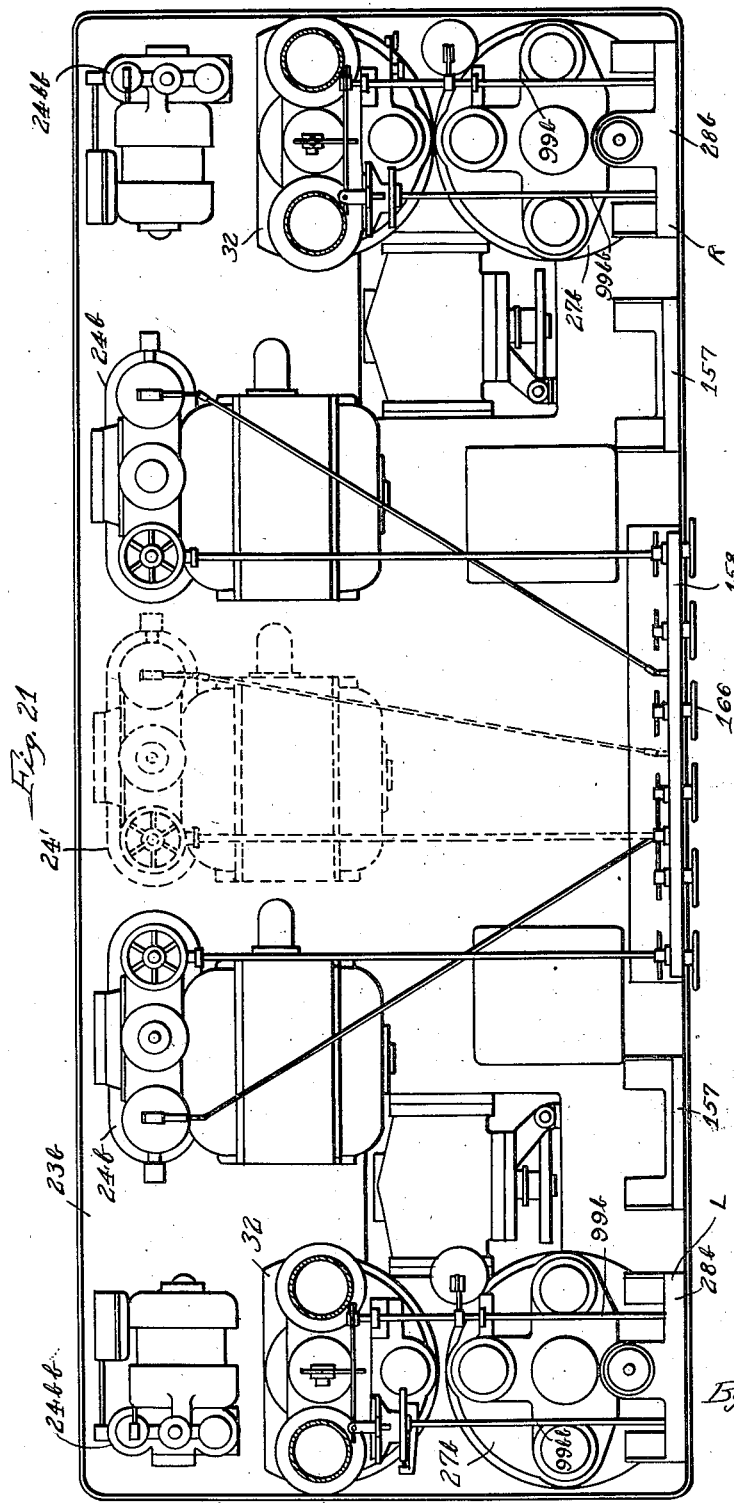

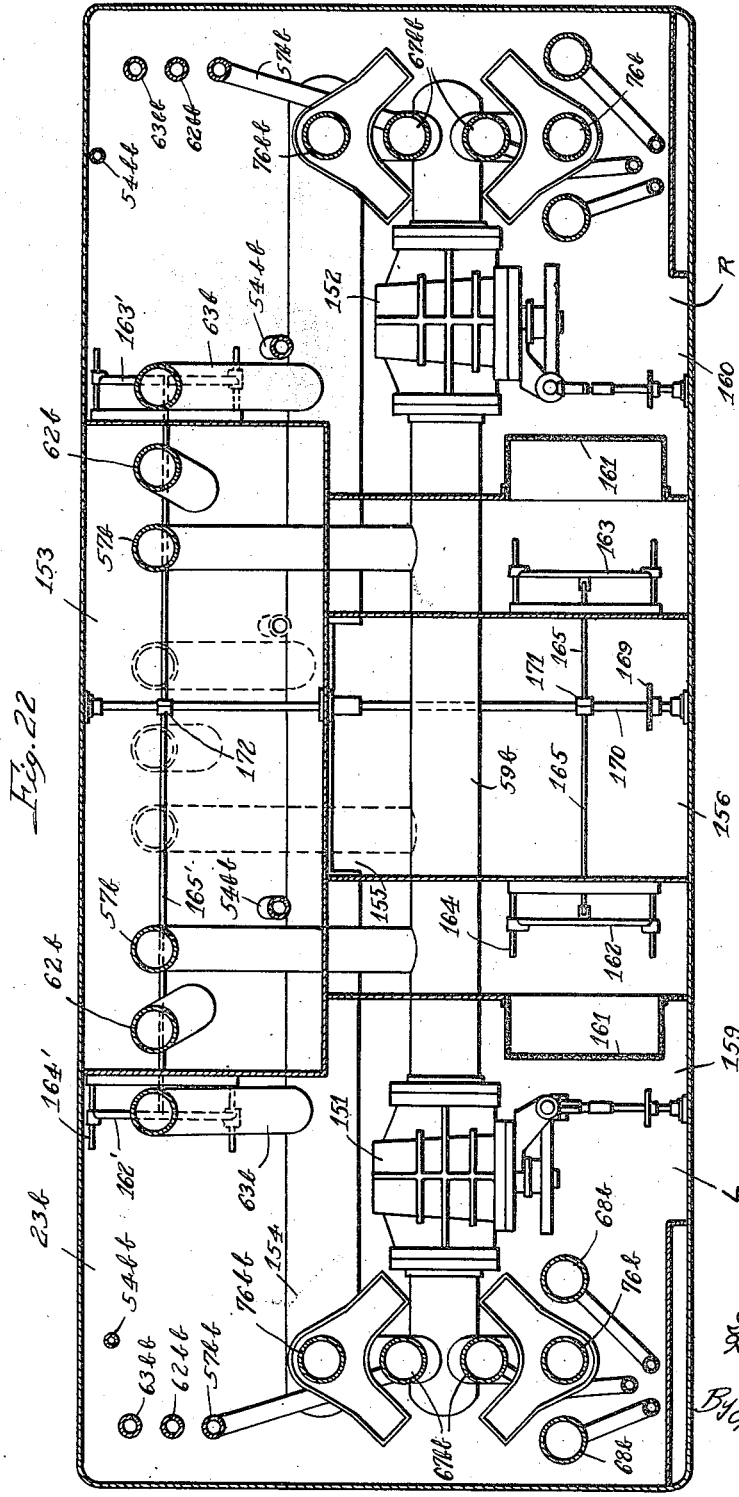

Aug. 6, 1940.  I. C. MARTIN ET AL  2,209,987
CABINET TYPE ACTUATOR GOVERNOR
Filed Sept. 20, 1937  14 Sheets-Sheet 14
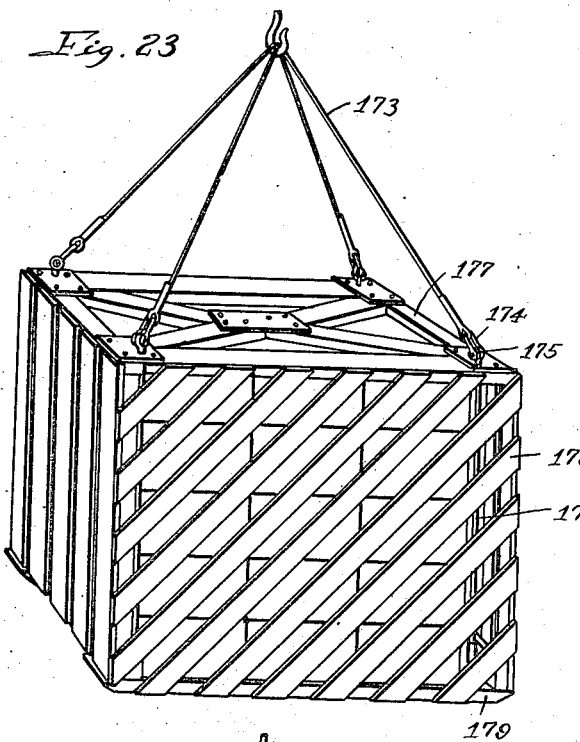
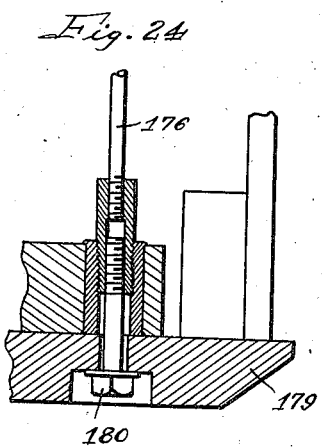
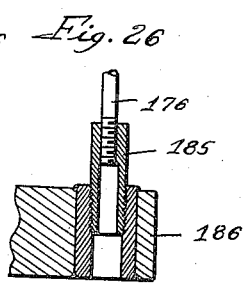
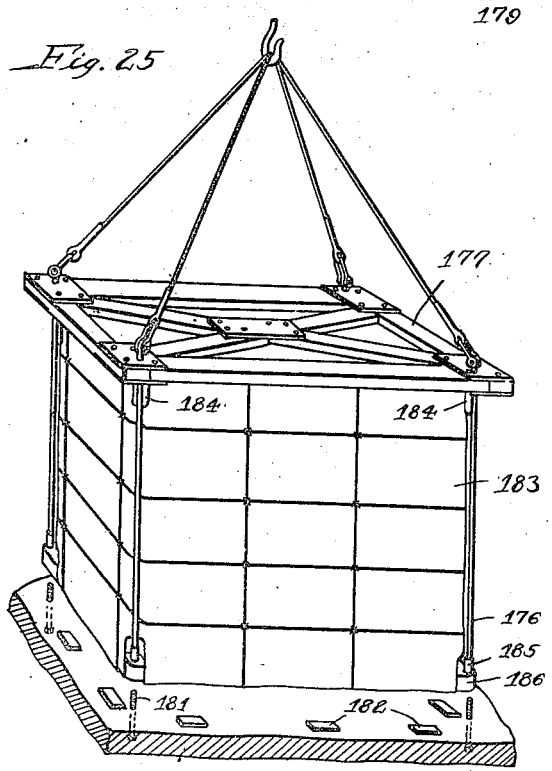
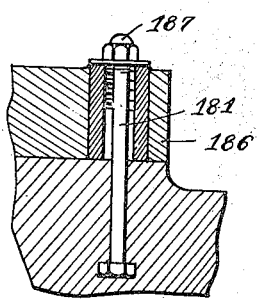

Patented Aug. 6, 1940

2,209,987

UNITED STATES PATENT OFFICE 2,209,987

CABINET TYPE ACTUATOR GOVERNOR

Irl C. Martin and Helmer Walter Thorell, Rockford, Ill., assignors to Woodward Governor Company, Rockford, Ill., a corporation of Illinois Application September 20, 1937, Serial No. 164,738

19 Claims. (Cl. 264—14)

This invention relates to governor equipment for hydro-electric power plants, and more particularly a new and improved cabinet type actuator governor.

Governor installations, prior to our invention, varied considerably in design according to the different power plant layouts and the size of governing equipment required, as well as the degree of close regulation called for. The governor equipment usually was scattered throughout the plant, with the pressure tank at one point, the sump tank at another, the governor head somewhere else, etc., which meant the necessity of a lot of unsightly piping, and the likelihood of leakage, and also the objection that the length of the oil column being accelerated and decelerated each time a relocation of the gates is necessary greatly increased the regulating dead time and accordingly reduced governing sensitivity and accuracy. Obviously too, such equipment had to be put together on the job with resulting disadvantages. Very little thought was given to standardization and unitary construction, although the steadily increasing demands for close regulation of hydro-electric units brought about numerous other improvements and refinements. As a result, since standardized unitary designs have not been available it has been necessary for governor designers to enter into the initial study of each power project so as to work out the governing equipment in step with the evolution of the rest of the plant control scheme. This not only complicated and slowed up matters, but meant increased cost all around. Then too, since no two plants were much alike it follows that service troubles apt to arise in one plant had proportionately small bearing on what might be encountered or anticipated with governing equipment in some other plant, owing to the difference in installations. This, therefore, meant increased maintenance expense. It is, therefore, the principal object of our invention to provide a cabinet type actuator governor of a more or less standard unitary form usable in various plants, when constructed in sizes to meet specifications, whereby to simplify the engineering design of plants in the first instance, effect radical savings in designing and installation costs, and also effect appreciable savings in plant maintenance expense, while permitting maximum shop construction and assembly, and allowing coordination, adjustment and testing of the component parts of the equipment in the unitary assembly before shipment to the power plant where it is to be installed.

In accordance with our invention, we consolidate four of the principal components of a standard governor, or five of the principal components of an adjustable blade type turbine governor, into a single neat, compact, and easily operated unit of novel design and construction. This results in a reduction in inter-connecting oil piping and the number of pipe joints and makes for lower installation and maintenance costs, and the shorter length of fluctuating oil column reduces the regulating dead time. Furthermore, the neat appearance of the unit permits its location in the most strategic position in the plant from an operating standpoint, while the localization of all controls and indicators on the unit greatly facilitates operation.

It is another important object of our invention to provide a unit of the kind mentioned in which a large sump tank base, in addition to supplying the necessary sump volume for the governing system, also forms a mounting and drip collector for the gate control valve or valves, motor driven pumping unit or units, and the control column or columns supporting the various control mechanisms and gauges, including the governor head or heads and compensating mechanisms. In the case of an adjustable blade governor, the runner blade operating valve mechanism or mechanisms are also mounted on the sump tank base. With this construction all packing can be eliminated and such minor oil leakage as may occur is collected directly on top of and discharged into the sump tank, and the relay and pilot valves also discharge directly into the tank, thereby reducing the usual amount of oil friction, which meant loss in operating time, while also eliminating back pressure, and accordingly reducing operating dead time to a minimum. Furthermore, the piping required to inter-connect the various parts and which normally would be laid in trenches in the floor of the power house in an unsightly manner is incorporated within the sump tank base and is consequently out of sight and any leakage therefrom goes directly into the tank and is, therefore, not wasted and does not present any problem in keeping the power house clean.

Another object is to provide double and other multiple units having a common sump tank base and interconnected piping. Thus, for example, in a "twin system" type, two actuators, together with the necessary pumps, valves, gauges and controls are mounted together on a common sump base large enough to hold all of the oil necessary, and this base is divided in half and the necessary valves are provided for isolating either half of the sump, pressure tank, relay valve, or any pumping unit without interfering with the operation of the rest of the equipment.

Still another object is to provide a unit of the kind mentioned completely enclosed within a cabinet with gauges and controls visible on the front thereof, for neat and attractive appearance and handier operation and also to keep the working parts clean, although easily accessible for inspection and adjustment.

A still further object is to so construct the cabinet and base that the crating of the unit and handling thereof in shipment and upon arrival at the power plant are greatly facilitated and no difficulty is encountered in setting the unit down on its foundation bolts.

The foregoing and other objects of the invention will appear as reference is made in the following detailed description to the accompanying drawings, wherein—

Figs. 1a and 2a are views corresponding to Figs. 1 and 2 showing a typical old type governor installation for a similar plant;

Fig. 5 is a longitudinal vertical section through the unit of Figs. 1 and 3;

Fig. 6 is an inside plan view of the unit with the outer cabinet removed, and Fig. 7 is a horizontal section through its sump tank base;

Figs. 8 to 12 are details of the unit's restoring connections, in which Fig. 9 is a vertical section on the line 9—9 of Fig. 10, Fig. 11 is an enlarged plan view of a portion of Fig. 8, and Fig. 12 is an enlarged horizontal section on the line 12—12 of Fig. 8;

Figs. 13 and 14 are sections through the lower portions of two different types of pressure tanks usable with the present units, as indicated in Fig. 2;

Fig. 16 is a view similar to Fig. 1 showing a typical "twin system" installation using another form of unit suited for that purpose and made in acordance with our invention, which provides mechanism and valves for automatic control of not only the gates but also the runner blades;

Figs. 17 and 18 are plan views, Fig. 17 being taken from above the actuator cabinet and Fig. 18 from below the cabinet, at floor level;

Fig. 19 is an enlarged front view of the unit shown in Fig. 16;

Fig. 20 is a vertical cross-section through the unit on a still further enlarged scale;

Figs. 21 and 22 are, respectively, an inside plan view of the same unit with the outer cabinet removed, and a horizontal section through the sump tank base thereof;

Fig. 23 is a perspective view showing how the crated unit is adapted to be handled in shipment and at the power house;

Fig. 24 is a sectional detail through a corner of the base, showing the attachment of the lifting bolt and method of fastening the skids;

Fig. 25 is a view similar to Fig. 23 illustrating the unit with all but the top of the crate removed ready for lowering onto the foundation bolts, and Figs. 26 and 27 are sectional details showing how the corners of the base are constructed to facilitate the fastening down thereof.

Similar reference numerals are applied to corresponding parts throughout the views.

Figure 2:
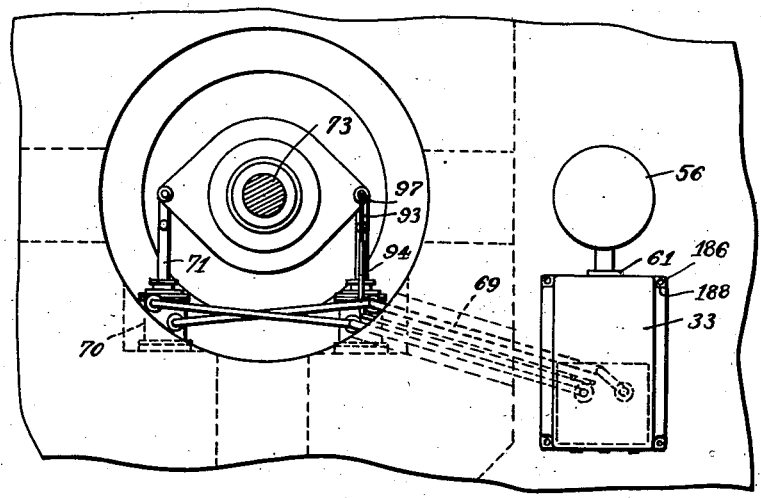
Figures 1 and 2 are, respectively, a vertical section and plan view of a typical power plant installation using a "unit type" cabinet actuator governor made in accordance with our invention, the plan view showing the turbine shaft in cross-section at floor level.

The term "actuator" it must first of all be understood, is used to designate a governor, the valves and control mechanism of which are separated from the servo-motors or power cylinders. There are three connections between a turbine and its actuator, as disclosed, for example, in Figs. 1a and 2a: (1) the connection for driving the governor head; (2) the power connection (oil piping) between the actuator valves and the servo-motors, and (3) the restoring or compensating connection. A "governor" has only two connections with the water wheel or turbine: (1) the connection for driving the governor head, and (2) the torsional gate shaft, which combines both the power connection and compensating connection.

The present invention of a "cabinet type actuator governor" constitutes an improvement on the old actuators, or actuator governors, as they were called. It has in view consolidating the actuator, pumping unit, sump tank, pressure tank, piping, and restoring connections into a single neat, compact and easily operated unit. The invention further aims to provide two general types of these units: (1) The "unit" type for the governing of one unit only, and (2) the "twin system" type, arranged so that the actuator and oil pressure systems of two units may be so interconnected as to make available to each the pumping and pressure tank capacity of the other. Their component parts—the actuators, oil pumps, controls, and auxiliaries—are substantially identical for both types, differing only in arrangement.

In general, the "unit" type governing equipment will be used where the volume of the servo-motors of the turbine to be regulated is small enough so that manual control of the gates by means of a hand pump is feasible and where there is sufficient regulating capacity available on the connected system so that the loss of the regulating capacity of one unit would not be serious. Hand pumps are incorporated in these units only up to a certain size of unit and serve to maintain the unit on the line at fixed gate in case of failure of the oil pressure system, until the trouble has been rectified, and also to start and stop the unit in an emergency.

The "twin system" type of unit is generally used where the servo-motor volume is so great as to make manual control by means of a hand pump impracticable, or if the loss of the regulating capacity of one unit would be serious. This type of unit gives the advantage of dual oil supply and capacity and is usually equipped with manually operable segregating valves to isolate one governor from the other. This type of unit also has the advantage of being adaptable to so many different arrangements to accommodate a particular plant development program. Thus, for example, if only one of the two units of a "twin system" unit is to be installed initially with the second one to be added later, different arrangements are available. In one case the pump is a part of the actuator unit and provides oil pumping capacity for the individual unit without reserve capacity prior to the installation and interconnection of the second unit. In another arrangement the pumps are mounted in a separate unit and provide reserve pumping capacity for the first unit prior to the installation and interconnection of the second unit. In a third arrangement, illustrated herein in Figs. 16 to 22, the two units of the "twin system" unit are installed at the same time, and this arrangement. in addition to consolidating all of the equipment into one unit, has the advantage of providing a certain amount of space for mounting generator and turbine gauges.

The "unit" type actuator is illustrated in Figs. 1 to 7. It comprises a sump tank base 23 on which are assembled the pumping unit 24, the magnetic switch 25 for controlling the motor 26 of the pumping unit 24, the gate control or relay valve 27, and the control panel 28. The latter forms a support for the various control mechanisms and gauges, the governor head 29 and its drive motor 30, as well as the compensating mechanism 31. The unit illustrated is for a standard governor requiring only gate control. A unit for an adjustable blade governor would also include with the devices mounted on the sump tank base 23 a Kaplan blade operating valve mechanism, like those shown at 32 in Fig. 21, with its related restoring connections and piping to the runner blade servo-motor. The tank 23 is not merely a supporting base for the devices mentioned but, as will soon appear, its depressed top 23' serves as a drip or drain pan to catch oil dripping or discharged from any of these devices and conduct such oil back to the oil in the sump tank to be used over and over.

The instruments and controls on the front of the panel 28 visible and accessible for operation from in front of the cabinet 33 are (1) the tachometer 34 graduated both in revolutions per minute of the turbine shaft and in frequency; (2) an oil pressure gauge 35 showing the governor system oil pressure; (3) an indicator 36 to show the angular position of the blades of an adjustable blade wheel (in the case of an adjustable blade governor); (4) a duplex air pressure gauge 37 one hand of which shows generator air-brake system pressure and the other brake cylinder pressure; (5) another duplex indicator 38 showing valve position, the one hand showing the position of the port valves of the main gate control relay valve and the other hand showing the position of the port valve of the auxiliary gate control relay valve; (6) an indicator 39 showing the speed droop for which the unit is adjusted, the dial being graduated from zero percent to five percent in terms of full servo-motor stroke; (7) a duplex gate indicator 40 one hand of which shows the gate limit and the other hand the gate position, the dial being graduated in tenths of gate openings; (8) a duplex indicator 41 showing the exact setting of the speed adjustment, the dial being graduated from fifteen percent below normal speed to five percent above normal speed with one hand making a complete revolution for one percent speed adjustment indication of the other hand; (9) a manual speed droop adjustment knob 42; (10) a gate limit control knob 43; (11) a speed adjustment knob 44; (12) a switch and pilot light panel 45, the switch of which is connected in parallel with the switch 25 to control the pumping unit 24 for continuous operation or pressure switch control, while the pilot light 46 indicates when the pump is operating; (13) a generator brake control valve 47 which permits manual control of the generator brakes, the application or release of which is shown on the gauge 37; (14) a control knob 48 for shifting from the main relay valve 27 to the auxiliary relay valve 49, and vice versa, and (15) a switch and pilot light panel 50, the switch of which controls the light 51 inside the cabinet 33, while the pilot light 52 indicates when this light is turned on. The bezels for the instruments 34 to 41 are all carried on the front wall of the cabinet and are removable from the instruments with the cabinet. The hinged door 53 in the lower front wall of the cabinet may be opened to afford access to the panel 54 on the front of the sump tank base 23 carrying the electrical connections for the various electrical devices in the unit. The conduits 54a and 54b appearing in Fig. 7, for example, contain electrical wiring for the pump motor 26 having connection with suitable terminals on the panel 54. By extending the conduits through the sump tank base in this manner the wiring is kept concealed and neater appearance is obtained. A terminal block 55 for the air pipes in the unit is also accessible when the door is opened.

The pressure tank appearing at 56 in Fig. 2 is like that shown in Fig. 13, although as will presently appear a pressure tank 56' illustrated in Fig. 14 may be used. Assuming the tank 56 is used, the discharge pipe 57 from the pump unit 24 connects with the pipe 58 extending into the tank 56 while the header 59 in the sump tank base 23 connects with the pipe 60 extending from the tank 56. The one union 61 completes the double pipe connection since the pipe 57 extends inside the header 59 as shown. 62 is the suction pipe for the pump unit 24 reaching down to a point near the bottom of the sump tank, while 63 is an unloader discharge pipe extending downwardly from the pump into the sump tank on the opposite side of the vertical partition 64 from the suction and discharge pipes mentioned. The partition 64 has an opening communicating with the oil strainer basket 65 containing the inclined strainer screen 66 so that oil can flow from the front chamber into the rear chamber in the sump tank. By having the unloading pipe 63 in the front chamber we insure release from the oil of any air before the oil is taken in by the pump through the suction pipe 62.

67 indicates a pressure connection from the header 59 to the gate control or relay valve 27, and at 68 are the servo-motor port pipes extending down from the gate control valve 27 through the bottom of the sump tank for connection with the pipes 69 extending to the servo-motors 70. The latter have their reciprocable pistons 71 connected with the gates for the turbine 72 in the usual way. 73 is the turbine shaft driving the generator 74, and 75 indicates the permanent magnet generator which furnishes the current for driving the governor head motor 30. When the gates are being adjusted oil is delivered into one end of the servo-motor cylinders to move the pistons, and oil discharged from the other end of the cylinders goes through the gate control or relay valve 27 and is discharged back into the sump tank. The pipes 76 are discharging pipes extending down from the valve 27. The valve 27, as will soon appear, is operated by a pilot valve 77, the shifting of which operates a plunger in the intermediate valve 78 to operate valve 27. The strainer and drain cock 77' associated with the pilot valve 77 is for preventing dirt reaching the pilot valve, and is designed to be flushed now and then to keep its strainer clear, by opening the cock. The latter discharges directly into the sump through the hand-hole 103' in the top of the tank 23.

The auxiliary relay valve 49 has a pressure connection 79 with the header 59 and also a connection 80 with the hand pump 81 whose suction pipe 82 extends down into the sump tank 23 as shown. Check valve 81a prevents flow into the header 59 when the pump 81 is operated and check valve 81b traps pressure in the line when the hand pumping is stopped, while also preventing back flow through the pump during power operation. At 83 are indicated pipes connecting the auxiliary valve 49 with the pipes 69 communicating with ports of the servo-motors 70, and at 84 are indicated the discharge pipes from the auxiliary valve 49 discharging into the sump tank. A transfer valve 85 has a pressure connection 86 tapped into the auxiliary valves' pressure connection 79, and has pipes 86a and 86b extending to the valves 27 and 49, respectively. The valve 85 in one position closes the port valves of both valves 27 and 49, but in another position closes port valves of the auxiliary valve 49 and opens port valves of valve 27, and vice versa in a third position. The knob 48 operates the transfer valve 85 to shift from manual control of the turbine gates, by means of the hand pump 81 and auxiliary relay valve 49, to power control of the gates, by means of the valve 27 to which oil under pressure is delivered from the pressure tank 56, or 56', as the case may be. The hand pump method is slow even when the servo-motors are small, and such operation is resorted to only when system or motor pump oil pressure is not available.

The pipe 87 extending from the pressure header 59 is connected with the pilot valve 88 of the pump unit 24 which controls the operation of an unloader valve in the housing 89 to discharge oil through the pipe 63 back into the sump tank when the pressure in the tank 56, or 56', as the case may be, rises a certain percentage above normal working pressure. In the unloading operation the switch 90 is automatically operated to stop the motor 26, the latter being connected with the magnetic switch 25 for that purpose. The hand wheel 91 is for operating a shut-off valve to isolate the pump unit 24 from the pressure tank in the event it is desired to do some work on the pump unit.

Figure 4:
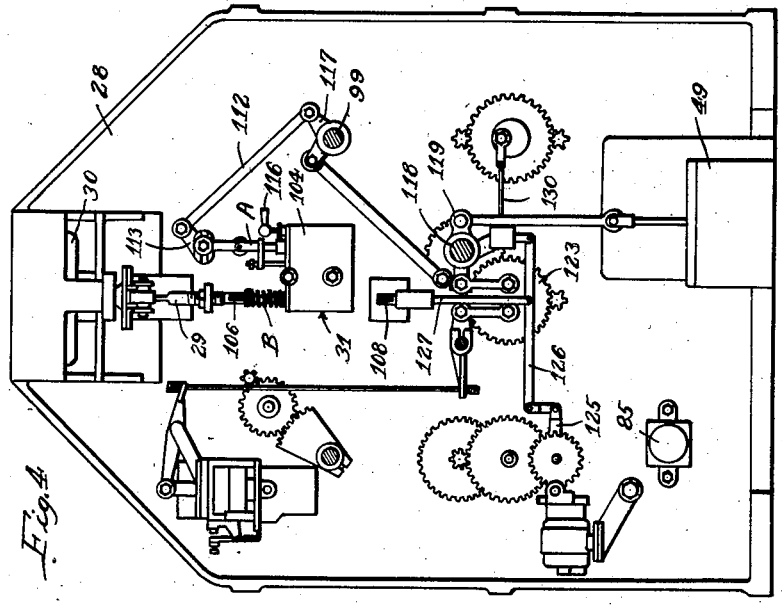
Fig. 4 is a view of the inner side of the control column.
Figure 3:
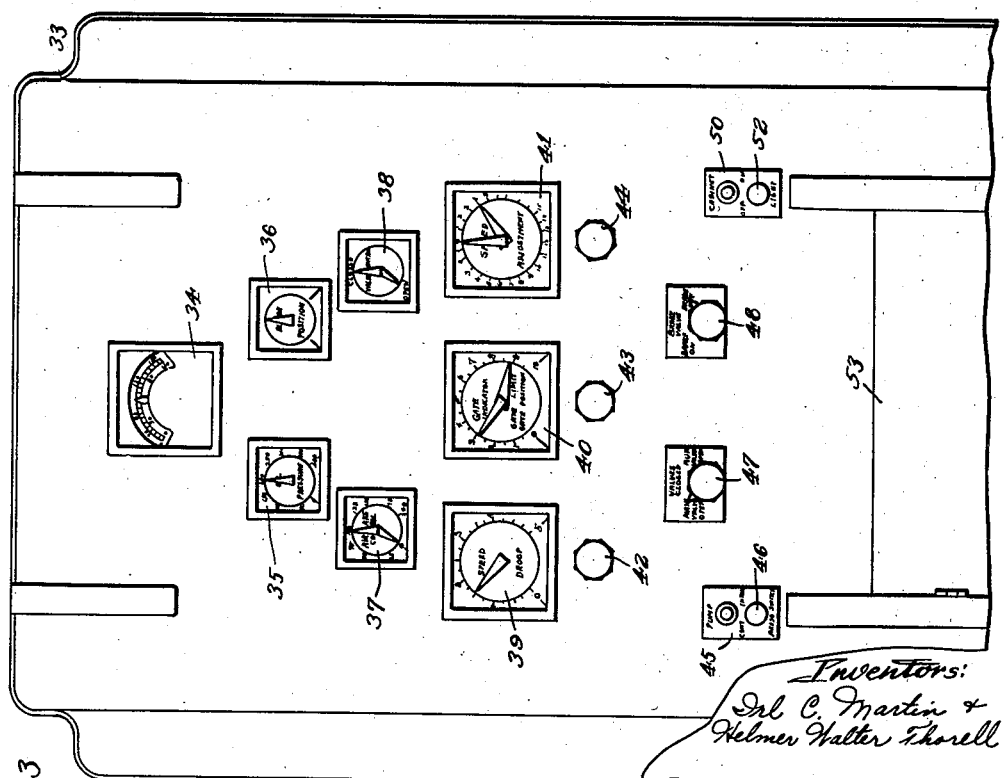
Fig. 3 is a front view of the unit on a larger scale, with the lower portion broken away to permit greater enlargement.

At 92 is shown a conduit which extends through the sump tank from top to bottom and forms a guide for the restoring cable 93. A conduit 94 communicates with the lower end of the conduit 92 and connects with other conduits 94 and sheave housings 95 at various points wherever a sheave 96 is needed to conduct the cable 93 around bends. The cable extends out from the remote end of this system of conduits and is connected as at 97 with one of the gate operating pistons 71. In that way the movement of the gates causes a proportionate movement of the restoring cable 93. The latter is connected to a segmental sheave 98 extending from one side of the compensating shaft 99. Another segmental sheave 100 extending from the opposite side of the shaft has a cable 101 connected thereto and supporting weights 102 suspended in the sump tank through the manhole 103. When the gates are closed the cable 93 turns the compensating shaft 99 so as to raise the weights 102 but when the gates are opened the weights 102 maintain the cable 93 taut by turning the shaft 99 as the weights descend. It will presently appear how the cable conduits and sheave housings are arranged to be kept filled with lubricant so as to insure easy, quiet operation and reduce wear to a minimum. The compensating shaft 99 operates the compensating mechanism previously generally referred to by the numeral 31 carried on the back of the control panel 28 (as shown in Fig. 4).

*Operation through governor head*

Figure 15:
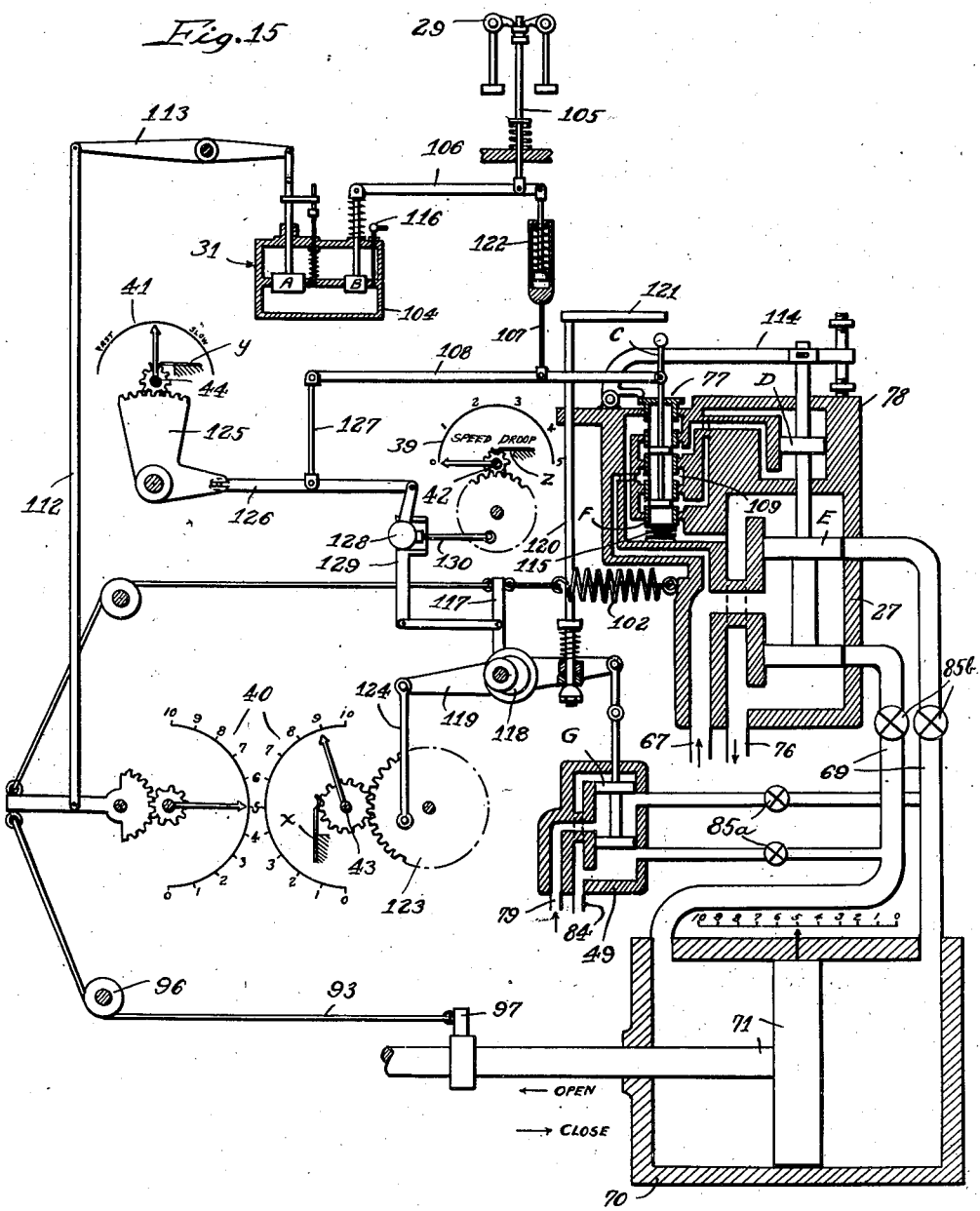
Fig. 15 is a schematic drawing of a governor installation using a unit of the kind shown in Figs. 1-12.

The operation of the unit can be traced most conveniently by reference to diagrammatic Fig. 15. To start with it will be assumed that the governor head 29 is turning at a normal speed with the plungers A and B in the compensating dash-pot 104 central. The plunger C of the pilot valve 77, the plunger D of the intermediate control valve 78, and plunger E of the main gate control valve 27 are also central with the gate limit set at nine-tenths gate opening. The gates are steady at five-tenths gate opening. Now, it will be assumed that load is suddenly dropped causing the speed of the governor head 29 to increase instantly. As the governor head flyballs move out, the speeder rod 105, floating lever 106, and connecting link 107 move downwardly, and in that way causes the floating lever 108 to move the plunger C of the pilot valve 77 downwardly. Pressure supplied through pipe 79 (Fig. 5) is thereby admitted from the chamber 109 into the top of the intermediate control valve 78 to force the control plunger D downwardly and thereby depress the pilot valve bushing F, through the medium of the lever 114 to center the pilot valve 77 and stop further movement of the relay valve. In this downward movement of plunger D, there is downward movement of the plunger E of the main control valve 27, which continues to the point where the ported bushing F of the pilot valve 77 is centered with respect to the plunger C. With the downward movement of plunger E, oil under pressure is admitted to the servo-motor 70 in front of the piston 71 and the gates operated thereby start to close. The oil under pressure delivered to the cylinder is supplied from the pressure tank 56, or 56', as the case may be, through one of the pipes 69 while oil is drained from the other end of the cylinder back to the sump tank 23 through the other pipe 69. When the gates start to close, the restoring cable 93 turns the compensating shaft 99 (Fig. 5) and, through it, actuates the compensating mechanism 31 to return the governor to equilibrium on a new gate setting. In the diagram, Fig. 15, this is represented by link 112 pulling the left-hand end of the rocker arm 113 downwardly so as to move the large compensating dash-pot plunger A upwardly. In this operation the small plunger B is drawn downwardly, both chambers in the dash-pot 104 being nearly filled with oil. The left-hand end of the floating lever 106 is accordingly lowered thereby raising the connecting link 107 and raising the pilot valve plunger C, so that pressure is admitted from the chamber 109 to the bottom of the intermediate control valve 78. In that way the control plunger D and main plunger E are moved upwardly, closing the ports of the main control valve 27 and stopping the piston 71. In this operation the lever 114 is raised and permits the spring 115 to force the pilot valve bushing F upwardly until it becomes centered with the plunger C, thereby stopping the control plunger D and the plunger E exactly on center and stopping all oil flow and accordingly stopping the gates at the new opening corresponding to the new load on the turbine 72. All parts are now centralized except the large compensating dash-pot plunger A, the small compensating dash-pot plunger B, floating lever 106, speeder rod 105 and the fly-balls of the governor head 29. If the compensating dash-pot needle valve 116 is properly set, the small plunger B will return to its normal central position at the same rate as the speed of the turbine 72, and consequently the speed of the fly-balls 29, returns to normal. The upward movement of the small plunger B will thus compensate for the upward movement of the speeder rod 105 as the fly-balls 29 return to their central position. The link 107 will accordingly remain centered and there will be no false movement of the gates. The operation is similar but in the opposite direction when the load is suddenly increased and the speed of the governor head 29 is accordingly decreased. In either case the restoring cable 93 follows the movement of the gates and the pilot valve plunger C and bushing F are returned to normal position in a similar manner as just described, the compensating mechanism performing similarly as stated.

*Manual control*

The knob 43 can be turned manually to start or stop the turbine. When the gates are closed and the governor head 29 is, of course, at a standstill, since the turbine is idle, the gates can be opened and the turbine set into operation by turning the knob 43 clockwise from the zero position to say the position shown in Fig. 15, which indicates nine-tenths gate opening. This operation causes counterclockwise turning of the gear 123, and the link 124 pulls the left-hand end of lever 119 downwardly, thereby raising the rod 120 and finger 121 and permitting the spring 122 to raise the pilot valve plunger C and admit pressure from the chamber 109 to the bottom of the intermediate control valve 78. The control plunger D is accordingly raised and the plunger E with it. The lever 114 moving upwardly with the plunger D is followed by the bushing F of the pilot valve 77, under the action of its spring 115, so that the flow of fluid from chamber 109 into the intermediate control valve 78 is cut off to prevent further movement of the plungers D and E. The piston 71 moves to the left and opens the gates, the extent of gate opening being in proportion to the extent of piston movement. The piston 71 moves forward so long as the plunger E is off center. The restoring cable 93 actuates the compensating mechanism 31 in the manner previously described to lower the pilot valve plunger C through the medium of the link 107 and lever 108, so as to re-center the main control valve plunger E and stop the piston 71 and thereby halt the gate opening movement. In the re-centering of the plunger E, the friction device keeps the knob 43 from turning. The governor head 29, under the conditions described, is then in control to open the gates in the event of increased load and close the gates in the event of decreased load, in the manner as above described, so as to maintain uniform speed of the turbine shaft. The operator may at any time, when it is desired to stop the turbine, turn the knob 43 back to zero and thereby effect closing of the gates in a manner believed to be evident from the description just given for starting up.

The turbine is controllable entirely manually through the medium of the auxiliary relay valve 49 when the selector valve 85, above described, is operated by means of knob 47 to open the valve ports 85a and close the valve ports 85b. The ports 85a are closed and the ports 85b opened when the turbine is under automatic control of the governor head 29. In the manual operation, the hand pump 81 furnishes the oil under pressure. To illustrate manual control of the turbine: When the gates are set at say five-tenths opening and the one hand of regulator 40 is shifted to a position for say nine-tenths opening, as illustrated in Fig. 15, the gear 123 will be rotated counter-clockwise forcing the connecting rod 124 downwardly and accordingly raising the right hand end of lever 119. The plunger G being thereby forced upwardly, admits pressure fluid to the opening port of the servo-motor 70. The piston 71 accordingly opens the gates and the restoring cable 93 allows the lever 117 to swing in a clockwise direction to rotate the shaft 118. The weights 102 are here indicated diagrammatically by a tension spring. Since the left-hand end of the lever 119 is stationary, the right-hand end will move downward and the plunger G will accordingly be centered and all oil flow stopped as the gates reach nine-tenths position.

While we have described the operation as applying to a standard governor, it should be clear that a blade operating valve mechanism would, in the case of an adjustable blade governor, be mounted along with the gate control valve on the sump tank base as previously described. In such units the restoring cable 93 causes both valves to be actuated to return to neutral with the blades and gates in a new setting.

*Speed adjustment*

As further illustrated in Fig. 15, if the speed adjustment knob 44 is operated, let us say to move the pointer of the dial 41 to the left, for faster operation, the left-hand end of the floating lever 108 will be lowered by reason of the clockwise turning of the bell crank lever 125 and the downward movement of the floating lever 126 and link 127 connecting the same with the floating lever 108. As a result the pilot valve plunger C is raised, admitting pressure to the bottom of the intermediate control valve 78 and causing the control plungers D and E to be raised so that the piston 71 is moved forward to open the gates. This opening of the gates increases the speed of the unit and consequently the fly-balls of the governor head 29 move outwardly to a new normal position, the amount of movement being whatever is necessary to re-center the pilot valve 77. The unit then continues operating at a new speed level. Manifestly the opposite effect is obtained by moving the speed adjusting pointer to the right for a lower speed. The friction device Y prevents undesired movement of the knob 44.

*Speed droop adjustment*

As also illustrated in Fig. 15, the pointer indicating speed droop on the indicator 39 is set at zero. 128 is a sliding fulcrum illustrated exactly on the center of lever 129 and, consequently, as the lever 129 moves, there is no change in the position of the right-hand end of the floating lever 126. However, if the speed droop hand is moved to the right, away from zero, the sliding fulcrum 128 is moved to the right by the link 130, off center with respect to the lever 129. Now, as the gates move toward open position, the right-hand end of the lever 126 will be raised an amount corresponding to the gate movement and the left-hand end of lever 108 will be corresponding raised. This causes the pilot valve plunger C to be lowered and it assumes a new central position for each gate position. This produces a droop in the speed level as the gates move from the closed to the open position, of an amount determined by the setting of the speed droop hand. The friction device Z prevents undesired turning of the knob 42, which controls the speed droop adjustment.

Advantages

It should be clear from the description that we have provided a cabinet type actuator governor which:

(1) Consolidates the principal component parts of a governor into a single neat, compact, and easily operated unit, requiring less piping and fewer pipe joints, and effecting considerable savings in installation, operation and maintenance costs;

(2) Standardizes governor equipment, so that two or three standard type units are available, adaptable to practically any power plant installation, thereby effecting further savings in engineering costs, while simplifying servicing by the governor manufacturer, because the performance of standard type units does not involve the uncertainties like special installations, with their great variety of designs to fit different conditions in different plants;

(3) Permits maximum shop construction and assembly, by reason of the unitary construction, allowing coordination, adjustment and testing of component parts before shipment;

(4) Permits saving in floor space, a saving in building costs by eliminating pipe trenches or holes in the floor;

(5) Shortens the fluctuating oil columns, thus reducing regulating dead time;

(6) Permits use of packless valve glands because all oil leaks in the unit drain into the sump tank directly below, loss of oil in the system and messing of the plant by such leakage being entirely avoided;

(7) Is easier to keep clean, both as to exposed surfaces and internal working parts, the latter being all enclosed in the cabinet, out of sight but still easily accessible;

(8) Greatly facilitates adding to standard actuator assemblies special indicating and control elements to suit individual requirements;

(9) Provides space for mounting turbine and generator instruments, electrical switching equipment, controls, and indicators that would otherwise have to be mounted on a separate cubicle;

(10) Provides accommodation of the blade operating control valve and operating mechanism directly connected to the gate control mechanism, reducing the amount of piping to the blade operating valve, and

(11) Permits location of governing equipment at the most strategic point in the plant from the operating standpoint, the unit having the requisite harmony of design and neatness of appearance to permit this.

Comparison with old type

Figure 1:
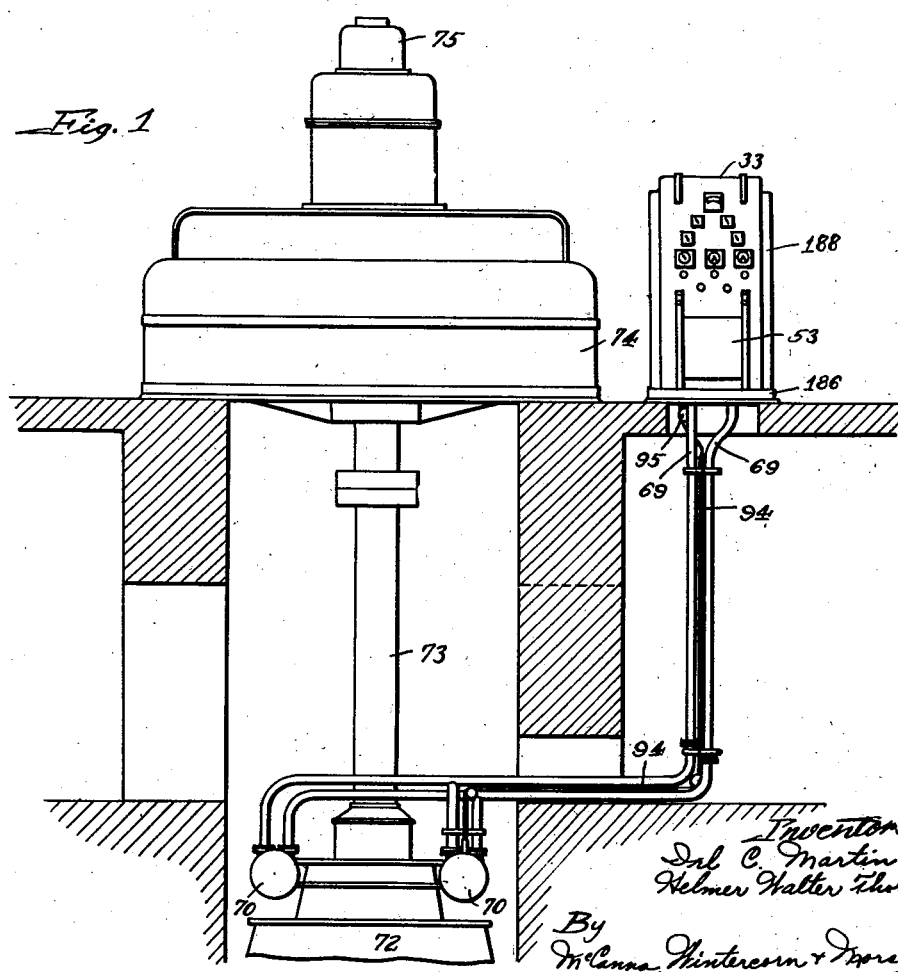

Reference may be had briefly to Figs. 1a and 2a showing a typical old type governor installation. A comparison of these views with Figs. 1 and 2 illustrating the novel cabinet type actuator governor of the present invention will serve to show the extent to which all of the advantages outlined above are realized with the present invention. In the plant shown, the pressure tank 56a is far away from the pump unit 24a and the latter is some distance from the sump tank 23a. This makes it necessary to provide long pipe connections, and a lot of pipe fittings are necessitated because of the fact that the pressure tank and pump unit are on one elevation while the sump tank is on another. Furthermore, all of this equipment is at some distance from the servomotors 70a, which necessitates still further long piping and a lot of fittings. The pipes are located in trenches 131 provided in the floor of the power house. The device indicated at 132 is an actuator governor similar to what was previously described as being commonly used prior to this invention. It includes the gate control valve 27a. This "actuator governor," if it can be compared at all with the "cabinet type actuator governor" of Figs. 1–7 might be said to comprise only some of what is mounted on the back or inner side of the control panel 28, plus the gate control valve 27, there being nothing in the unit 132 corresponding to the rest of the cabinet type actuator governor; the balance of those items are located, as shown, in remote relation to this unit at scattered points in the power plant. The fact that the various items are so separated necessitates not only the discharge pipe connection 57a between the pump unit 24a and the pressure tank 56a, but also the long pipe connection 87a to operate the pilot valve on the pump unit when a predetermined pressure is reached, so that the pump unit will cut off the discharge and its motor 26a will be stopped. Note also the long suction pipe connection 62a for the pump unit, and the long discharge connection 67a between the pressure tank 56a and the gate control valve 27a. Inasmuch as the gate control valve in this layout is not directly over the sump tank 23a, the discharge connection 76a is necessarily quite long. The power pipe connections 69a with the servomotors 70a are also necessarily quite long in this layout, and the same is true of the restoring connections 93a. Realizing that any oil leakage accumulating in the base 133 of the actuator governor 132 must be conveyed back to the sump tank, it is apparent that a long pipe connection for that purpose is necessitated in this layout and such a pipe will appear like the pipe 82a, which in this particular installation happens to be the suction pipe for a hand pump in the actuator 132 for manual operation of the gates when pressure doesn't happen to be available. Then, too, it is apparent with this layout that if oil leakage is to be conducted from the pump unit 24a to the sump tank 23a, additional piping for that purpose is necessitated, as, for example, the pipe 134. It is, therefore, clear that the building cost in the first instance is higher with such a layout, because of the pipe trenches required and the fact that so much floor space is taken up with the scattered governing equipment and intermediate connections. The governor manufacturer in the working out of such power plant designs had to have his engineers work closely with the power plant engineers in order to work out the details of the governing equipment in proper relation to the working out of the rest of the plant and there was, therefore, considerable extra engineering expense entailed, which is saved where a standard unit is available, around which the rest of the power plant design can be easily worked out. Then, too, it is obvious that with this sort of layout, all of the assembling with the exception of the assembling of the actuator 132 had to be done on the job, so that there was no opportunity for coordinating, adjusting, and testing the component parts of the governing equipment at the plant of the governor manufacturer. Furthermore, with all of the long pipe connections between the actuator and the servo-motors, pressure tank, and sump tank, the fluctuating oil columns were so long that regulating dead time was greatly increased and the governor would not perform as well as with the cabinet type actuator governor of our invention, where the direct short pipe connections make for shortened oil columns and reduced regulating dead time. It should also be self-evident that the service troubles apt to be encountered in such a plant as disclosed in Figs. 1a and 2a are bound to be more serious than in a plant equipped with a standard unit of the compact design shown in Figs. 1 and 2. And, furthermore, there is not apt to be so much difficulty for the governor manufacturer to prescribe a remedy to fit the needs of a particular case where the governing equipment is of a standard unit design, because the service troubles arising with standard units become pretty definitely fixed and well known to the engineers of the governor manufacturer, whereas, there is no way of predicting what is apt to arise in the operation of a plant where the equipment installed has been modified to suit some special conditions or circumstances presented in the layout of that plant. Finally, with this layout a separate cubicle was almost invariably required on which to mount the turbine and generator instruments, electrical switching equipment, controls, and indicators, whereas, in our cabinet type actuator governor, the front panel 28 affords a good place for all of these items, as previously described, and this greatly facilitates operation.

Restoring connections

Referring to Figs. 8–12, the conduit 92 is shown in the sump tank 23, connected with the conduits 94 and sheave housings 95 for housing the restoring cable 93 and sheaves 96. The conduits 94 are supported at spaced points on the pipes 69 extending to the servo-motors 70, straps 135 being provided for that purpose with U-bolts 136 anchoring the same to the pipes 69 and other U-bolts 137 anchoring the conduits 94 thereto. The conduits 94 thread into the necks 137 provided on the two-piece sheave housing 95, thereby supporting said housings together with the sheaves 96 therein. The halves of the sheave housings 95 are assembled on opposite sides of the sheaves 96 and held together by bolts 138 which at the same time support the bearings 139 for the sheaves. Lubricator nipples 140 on these housings permit filling the same with lubricant. In fact, the entire system of conduits and housings are so filled to prevent rusting and minimize wear, and also insure easy operation of the cable 93. A packing gland 141, perforated for passage therethrough of the cable 93 and smooth sleeve covering 93', seals the outer end of the system of conduits 94, as indicated in Fig. 12. No seal is required on the upper end of the system, because if there is any surplus oil in the system it will drain into the sump 23 from pan 23', and this open end can be used to add oil to the system in case that becomes necessary.

Pressure tanks

Figs. 13 and 14 illustrate two types of pressure tanks suitable for use with the cabinet type actuator governor of our invention. The tank 56 (Fig. 13) has a base 142 under the bottom thereof through which the double pipe connection 58—60 extends for connection with the pipe 57 and header 59 in the sump tank 23. The ring 143, welded or otherwise secured in the center of the bottom of the tank, has the end of the double pipe connection secured therein, as shown, and it supports a valve seat ring 144 to cooperate with the float valve 145. This valve is operated by the float 146 that is suitably counter-weighted as at 147 and pivoted to the valve seat ring 144, as at 148. With this arrangement, since the valve 145 cooperates only with the outlet pipe 60, a small by-pass connection is afforded between the inlet pipe 58 and the outlet pipe past the spider 149 that spaces the ends of these pipes. This permits the operator to admit pressure to the outlet pipe 60 manually, as with a hand pump like the pump 81, to open the float valve 145 after it has seated, due to low oil level. The valve 145 closes on low oil level to retain the compressed air in the tank. The double pipe connection 58—60 is provided when the oil pump 24 is used not only to pump the oil but also supply the air cushion, and while this double pipe connection is shown connected to the bottom of the tank, it may be connected to the side or top, or the two pipes may be connected to the tank separately, with the float valve operating only on the outlet pipe.

A single pipe connection 60' is shown in the tank 56' in Fig. 14, and as indicated by the arrows, this pipe is both for inlet and outlet of oil under pressure. The union flange 61' is for connecting the pipe with the header 59 in the sump tank. This arrangement is generally used if the oil pump is not required to pump the air. In this arrangement the seat ring 144' cooperates with the float valve 145' that is operated by the float 146'. The latter is pivoted on the seat ring at 148'. In both tanks the oil level gauge 150 has a sight tube indicating directly the level of oil in the tank, and it is also common to provide an air blow-off valve at some point in the wall of the tank above the gauge to permit releasing the air pressure whenever desired.

Twin system or multiple type units

If the servo-motor volume is so great as to make manual control by means of a hand pump impracticable, or if the loss of the regulating capacity of one unit would be serious, then the "twin system" or multiple unit type is recommended, because that type gives dual or multiple oil supply and capacity. The particular style of unit selected will depend upon the particular plant development program, as previously pointed out. The "twin system" unit shown in Figs. 16–22 is used where both governors are installed at the same time, and the other arrangements briefly described previously are of an intermediate form, the construction and installation of which should be clear from the description of the single unit type and this twin system type.

The cabinet 33b encloses the "twin system" type unit, and, generally speaking, the unit thus enclosed is made up of two actuator governors L and R. These governors are of the adjustable blade type, each being associated with the generator 74b driven by a turbine shaft 73b and having pipes 69b extending from the Kaplan blade operating valves 32 to furnish the regulating oil columns inside the turbine shafts 73b to control the position of the runner blades in the turbine wheel in a well known manner, while other pipes 69bb extend from the gate control valves 27b to the servo-motors 70b in which the pistons 71b are connected with the gates to open and close the same in the usual way. There are conduits 94b and 94bb for the restoring cables, the conduits 94b containing the cables extending to the blade compensating shafts 99b and the conduits 94bb containing the cables extending to the gate compensating shafts 99bb. The pressure tanks 56b have pipe connections 60b with the pressure header 59b in the sump tank 23b, which extends the full length of the twin system unit and forms the base therefor. There are two valves 151 and 152 of a rotary plug type for isolating the right or left hand governor's pressure tank and related control valves. Two main pump units 24b are provided for the governors L and R, and two smaller pump units 24bb. The pump, indicated in dotted lines at 24', may or may not be provided, but at least there is room on the sump tank base 23b for this additional unit in the event the additional pumping capacity is found necessary or desirable. The pump units 24b have suction pipes 62b communicating with the suction chamber 153 in the sump tank 23b, while their discharge pipes 57b communicate with the header 59b. The pipes, indicated in dotted lines, are provided only where the pumping unit 24' is added. There is a discharge header 154 extending lengthwise in the sump tank under the pressure header 59b, and the pump unloader pipes 63b communicate therewith. The middle of this discharge header is open, as indicated at 155, to communicate with the discharge chamber 156 in the middle of the sump tank base. 67b indicate the pressure connections to the gate control valves 27b, and 67bb the pressure connections to the blade control valves 32, both communicating with the pressure header 59b. 76b designates the discharge connections for the gate control valves 27b, and 76bb the discharge connections for the blade control valves 32, both communicating with the discharge header 154. 68b designate the pipes communicating with the pipe 69bb extending to the servo-motors 70b. 57bb are the discharge connections from the small pump units 24bb to the pressure header 59b, and 62bb are their suction pipes, and 63bb their unloader pipes. The conduits 54bb are for the extension of electrical wiring through the sump tank to the various pump units. The panels 28b each corresponds to the panel 28 on the single unit type previously described. There are other panels 157 for the gauge controls for the two governors, and a middle panel 158 for the pump controls. The cabinet 33b encloses the entire unit and has openings in the front wall through which the various indicators on the five panels are visible, similarly as in the unit first described. There are also doors 53b for a similar purpose as the door 53 on the other unit.

Referring to Figs. 20 and 22, it will be seen that there are left and right hand sump compartments 159 and 160, respectively, both normally communicating with the suction chamber 153 and discharge chamber 156. At 161 are indicated strainer baskets for the filtering of the oil in its passage from the discharge chamber 156 back into the left and right end sump compartments 159 and 160. Valves 162 and 163 are slidable on guides 164 and interconnected by links 165 so that when the valve 162 is closed to isolate the left hand sump compartment 159 from the discharge chamber 156, the right hand compartment 160 is still in communication with the discharge chamber through the valve 163, but contrariwise, if the valve 163 is closed, compartment 159 will be in communication with discharge chamber 156, but compartment 160 isolated from the discharge chamber. There are similar valves 162' and 163' on guides 164' interconnected by links 165' controlling communication between the suction chamber 153 and the left and right hand sump compartments 159 and 160. One of the hand wheels on the front of the cabinet 33b at the middle thereof, the one numbered 166, is arranged to turn a sprocket 167 that is connected by the chain 168 with the sprocket 169 on the shaft 170 extending from front to rear in the sump tank. There are two arms 171 and 172 on the front and rear ends of this shaft, and these are pivotally connected with the links 165 and 165', respectively, whereby the four valves 162—163 and 162'—163' are operated simultaneously to isolate either of the left and right end sump compartments 159 and 160 from the suction and discharge chambers 153 and 156, respectively. However, even when one of these compartments 159 and 160 is segregated, the pump units associated with the related governor are still in communication with the other compartment through the headers 59b and 154, until the associated valve 151 or 152 is closed. That is done only when there is some work to be done on the governor associated with the valve that is closed. In other words, either half of the sump tank may be isolated together with the pressure tank, gate and blade control valves and pumping units without interfering with the operation of the rest of the equipment. The arrangement of the pumping equipment can be varied to suit operating conditions. The two small pump units will handle the necessary oil over periods of minor regulating demand, with the larger pump units automatically cutting in whenever the capacity of the smaller ones is exceeded. While the unit disclosed is shown provided with runner blade control mechanisms, it should be understood that units are designed with or without this provision.

The operation of this twin system unit should be clear from the description of the single unit, the only difference being that either of the governors in this twin system unit has access to the sump tank compartment of the other unit, making available double the oil supply and capacity. All of the advantages outlined with reference to the single unit first described apply to the twin system units as well, except that the operation of the twin system unit is more flexible by reason of the coupling together of the two governors in the manner described.

*Crating, shipping and placing unit*

Actuator governors are usually shipped in box cars with end opening doors. The unit is skidded out of the car on rollers and under the power house crane and is then picked up for transfer to its installation position, as shown in Fig. 23, by means of slings 173 attached by clevises 174 to the eyes 175 on the upper end of long lifting bolts 176 in the corners of the spreader 177 forming the top of the crate 178. The crating lumber on the sides is removed upon arrival of the unit at the installation position, and the skids 179 that are held in place by cap screws 180 are also removed, leaving the unit in the condition shown in Fig. 25, ready to be lowered onto the foundation bolts 181. At 182 are indicated leveling shims between the foundation bolts on which the base of the unit will rest. The covering 183 is of any suitable or preferred material to protect the cabinet finish, and this covering is, of course, removed either just before or right after the unit has been set in position, when the lifting bolts 176 and spreader 177 are removed. At 184 are indicated pads under the lifting bolts in the corners of the cabinet to prevent scarring the cabinet finish. The foundation bolts 181 find ample clearance in the sleeves 185 threaded into the corners 186 of the actuator base. These same sleeves constitute the connecting means between the lifting bolts 176 and the actuator base, as clearly appears in Figs. 24 and 26. Once the unit is resting on its foundation and the bolts 176 have been removed, the sleeves 185 are also removed, leaving the foundation bolts 181 projecting above the corners 186 of the base to the proper height to receive the washers and acorn nuts indicated at 187 in Fig. 17. Due to the concentrated weight in the unit and the absence of any forces tending to shift the same, foundation bolts are not usually required and may be omitted if desired, in which case, acorn headed plugs may be threaded into the corners 186 of the base to give substantially the same appearance as where acorn nuts are threaded on foundation bolts. The design of the actuator cabinet 33 and sump tank base 23 so that the corners 186 of the base project from the recessed or reentrant corners 188 of the cabinet permit crating and handling of the unit in the manner described, the long lifting bolts 176 being extended vertically along the recessed corners of the cabinet down to the projecting corners 186 of the base. The recessing of the corners of the cabinet furthermore forms an important feature of the modernistic design of these cabinets.

It is believed the foregoing description conveys a good understanding of the objects and advantages of our invention. The appended claims have been drawn with a view to covering all legitimate modifications and adaptations.

We claim:

1. A governor unit of the character described comprising a sump tank base, gate and blade control valves supported directly on top of said base and adapted to discharge fluid directly therein, a motor driven pump unit also mounted directly on top of said base having suction and unloader pipes extending downwardly from the pump directly into said base to draw fluid therefrom and return fluid thereto, pipes for conducting fluid under pressure from said valves to the servo-motors of a fluid controlled governor and for returning fluid therefrom communicating with said valves and extending downwardly therefrom through the sump tank base for connection with other pipes leading to and from the servo-motors, and a header in the sump tank base communicating with said valves and with said pump to deliver fluid under pressure to the valves.

2. In a governor unit of the character described, the combination of a sump tank base the top of which is adapted to serve as a support, two sets of governing equipment supported on opposite ends of said base, each set including at least one prime mover control valve and a motor driven pump unit, pipes for conducting fluid to and from said valves extending downwardly therefrom through the sump tank base for connection with other pipes leading to and from the prime movers controlled thereby, a pressure header and a discharge header extending lengthwise in said base, connections between said control valves and said pressure header at opposite ends of the latter for supplying fluid under pressure to the valves, connections between the pumps of the pump units and the pressure header for delivering fluid under pressure into the header, suction and unloader pipes extending downwardly from the pumps into the base, the suction pipes drawing fluid directly from the base and the unloader pipes communicating with the discharge header, discharge connections for said valves also communicating with the discharge header, said base being partitioned to provide a suction chamber communicating with the suction pipes, a discharge chamber communicating with the discharge header, and opposed end compartments communicating with the suction and discharge chambers through openings provided in the partitions at opposite sides of said suction and discharge chambers, and valves controlling said openings interconnected so that all of said valves in one position are open for unrestricted communication of the suction and discharge chambers with the end compartments in said base, but in each of two other positions the valves on one side of the suction and discharge chambers are closed and the valves on the other side open, allowing free communication between the suction and discharge chambers and one of said end compartments while the other of said end compartments is closed off from such communication, said valves being operable in either direction to close off one end compartment or the other.

3. A governor unit as set forth in claim 2, including separate pressure tanks connected with the pressure header near the opposite ends thereof, and separately operable segregating valves in said connections whereby both pressure tanks may be left in communication with the pressure header while the control valve at one end of said header is cut off from communication with either tank, the pressure tank connections and segregating valves being so arranged that the communication of both pump units with the pressure header is left undisturbed in the closing of either segregating valve.

4. In a governor unit of the character described, the combination of a sump tank base the top of which is adapted to serve as a support, two sets of governing equipment supported on opposite ends of said base, each set including at least one prime mover control valve and a motor driven pump unit, pipes for conducting fluid to and from said valves extending downwardly therefrom through the sump tank base for connection with other pipes leading to and from the prime movers controlled thereby, a pressure header extending lengthwise in said base from one end to the other, connections between said control valves and said pressure header at opposite ends of the latter for supplying fluid under pressure to the valves, connections between the pumps of the pump units and the pressure header for delivering fluid under pressure into the header, suction and unloader pipes extending downwardly from the pumps into the base, the suction pipes drawing fluid directly from the base and the unloader pipes discharging excess fluid back into the base, said control valves being also adapted to discharge fluid returned from the prime movers back into the base, separate pressure tanks connected with the pressure header near the opposite ends thereof, and separately operable segregating valves in said connections whereby both pressure tanks may be left in communication with the pressure header while the control valve at one end of said header is cut off from communication with either tank, the pressure tank connections and segregating valves being so arranged that the communication of both pump units with the pressure header is left undisturbed in the closing of either segregating valve.

5. A governor unit of the character described comprising a sump tank base, the top of which is adapted to serve as a support, a motor-operated pump unit supported on said base and having a suction pipe extending downwardly therefrom directly into said base to draw fluid therefrom, a control valve for fluid control of a prime mover mounted on said base, the same having pipes extending downwardly therefrom through the base adapted to be connected with pipes extending to and from the prime mover to conduct the controlling fluid to and from said prime mover, a discharge pipe also extending downwardly from said valve into said base for direct discharge therein of fluid returned from the prime mover, a pressure header in said base, a pressure connection between said header and said control valve for delivery of fluid under pressure to the valve, and a discharge pipe connection between the pump and said pressure header.

6. A governor unit of the character described comprising a sump tank base, the top of which is adapted to serve as a support, a motor-operated pump unit supported on said base and having a suction pipe extending downwardly therefrom directly into said base to draw fluid therefrom, a control valve for fluid control of a prime mover mounted on said base, the same having pipes extending downwardly therefrom through the base adapted to be connected with pipes extending to and from the prime mover to conduct the controlling fluid to and from said prime mover, a discharge pipe also extending downwardly from said valve into said base for direct discharge therein of fluid returned from the prime mover, a pressure header in said base, a pressure connection between said header and said control valve for delivery of fluid under pressure to the valve, a pressure tank having a pipe connection with one end of said header, and a discharge pipe connection for said pump extending downwardly into the header and through the last-mentioned pipe connection to the pressure tank.

7. A governor unit of the character described comprising a sump tank base, the top of which is adapted to serve as a support, a motor-operated pump unit supported on said base and having a suction pipe extending downwardly therefrom directly into said base to draw fluid therefrom, a control valve for fluid control of a prime mover mounted on said base, the same having pipes extending downwardly therefrom through the base adapted to be connected with pipes extending to and from the prime mover to conduct the controlling fluid to and from said prime mover, a discharge pipe also extending downwardly from said valve into said base for direct discharge therein of fluid returned from the prime mover, a pressure header in said base, a pressure connection between said header and said control valve for delivery of fluid under pressure to the valve, a pressure tank having a pipe connection with one end of said header, a discharge pipe connection for said pump extending downwardly into the header and through the last-mentioned pipe connection to the pressure tank, and a fluid operated valve in the pressure tank for closing off communication between the tank and both pipe connections but leaving the pump discharge pipe connection in communication with the header.

8. A governor unit of the character described comprising a sump tank base, the top of which is adapted to serve as a support, a motor-operated pump unit supported on said base and having a suction pipe extending downwardly therefrom directly into said base to draw fluid therefrom, a control valve for fluid control of a prime mover mounted on said base, the same having pipes extending downwardly therefrom through the base adapted to be connected with pipes extending to and from the prime mover to conduct the controlling fluid to and from said prime mover, a discharge pipe also extending downwardly from said valve into said base for direct discharge therein of fluid returned from the prime mover, a pressure header in said base, a pressure connection between said header and said control valve for delivery of fluid under pressure to the valve, a discharge pipe connection between the pump and said pressure header, a partition wall in the sump tank base separating a suction chamber from a discharge chamber, the suction chamber having the pump suction pipe communicating therewith and the discharge chamber having the valve discharge pipe communicating therewith, a pump unloader pipe extending downwardly from the pump into the discharge chamber in said base, the partition wall having an opening therein establishing communication between the suction and discharge chambers, and strainer means in the path of the fluid flowing from the discharge chamber into the suction chamber.

9. As an article of manufacture, a sump tank base for a governor unit comprising a tank of a size affording sufficient storage space therein for the bulk of the working fluid for a fluid controlled prime mover, the top of said tank being substantially flat and depressed to provide a combination valve and pump support and drip collector pan and having one or more drain openings provided therein, a plurality of ports provided in one portion of said top for registration with suction and discharge ports of a pump unit adapted to be mounted thereon, suction and discharge pipes in said tank extending from said ports and secured to the top of said tank in fluid tight relation thereto, said top having other ports provided in another portion thereof to register with the pressure and discharge ports of a prime mover control valve adapted to be mounted thereon, and pressure and discharge pipes in said tank communicating with said ports and secured to the top of said tank in fluid tight relation.

10. As an article of manufacture, a sump tank base for a governor unit comprising a tank of a size affording sufficient storage space therein for the bulk of the working fluid for a fluid controlled prime mover, the top of said tank being substantially flat and depressed to provide a combination valve and pump support and drip collector pan and having one or more drain openings provided therein, a plurality of ports provided in one portion of said top for registration with suction and discharge ports of a pump unit adapted to be mounted thereon, suction and discharge pipes in said tank extending from said ports and secured to the top of said tank in fluid tight relation thereto, said top having other ports provided in another portion thereof to register with the pressure and discharge ports of a prime mover control valve adapted to be mounted thereon, pressure and discharge pipes in said tank communicating with said ports and secured to the top of said tank in fluid tight relation, the top of said tank having two other ports provided therein in the last-mentioned group of ports for communication with ports in the control valve, and servo-motor port pipes in said tank communicating with the ports in the top of said tank and secured to the top of said tank in fluid tight relation thereto, said pipes extending downwardly in the tank and communicating with ports in the bottom of said tank and being secured at their lower ends to the bottom of said tank in fluid tight relation thereto, whereby to permit direct connection with said pipes of other pipes leading to and from the servo-motors of the prime mover.

11. As an article of manufacture, a sump tank base for a governor unit comprising a tank of a size affording sufficient storage space therein for the bulk of the working fluid for a fluid controlled prime mover, the top of said tank being substantially flat and depressed to provide a combination valve and pump support and drip collector pan and having one or more drain openings provided therein, a plurality of ports provided in one portion of said top for registration with suction and discharge ports of a pump unit adapted to be mounted thereon, suction and discharge pipes in said tank extending from said ports and secured to the top of said tank in fluid tight relation thereto, said top having other ports provided in another portion thereof to register with the pressure and discharge ports of a prime mover control valve adapted to be mounted thereon, pressure and discharge pipes in said tank communicating with said ports and secured to the top of said tank in fluid tight relation, and one or more conduits for electric wiring for the motor of the pump unit, extending through said sump tank and fixed at the ends in fluid tight relation to the walls of said tank.

12. A cabinet type actuator governor comprising a cabinet having a sump tank in the base thereof, pump and valve means supported on top of said tank inside the cabinet, the pump means drawing fluid directly from the tank and the valve means returning fluid directly into the tank, piping extending through the tank from the valve means for connection through one wall of the tank with a fluid controlled prime mover, a pressure tank for storing fluid under a head of air pressure, and pipe connections between the pump means and the tank and between the tank and the valve means all extending through the tank.

13. A cabinet type actuator governor comprising a cabinet having a sump tank in the base thereof, pump and valve means supported on top of said tank inside the cabinet, the pump means drawing fluid directly from the tank and the valve means returning fluid directly into the tank, piping extending through the tank from the valve means for connection through one wall of the tank with a fluid controlled prime mover, a pressure tank for storing fluid under a head of air pressure, a pressure header in the tank communicating with the valve means and having connection with the pressure tank, and a pipe connection between the pump means and the pressure tank extending through said sump tank.

14. A cabinet type actuator governor comprising a cabinet having a sump tank in the base thereof, pump and valve means supported on top of said tank inside the cabinet, the pump means drawing fluid directly from the tank and the valve means returning fluid directly into the tank, piping extending through the tank from the valve means for connection through one wall of the tank with a fluid controlled prime mover, a pressure tank for storing fluid under a head of air pressure, a pressure header in the tank communicating with the valve means and having connection with the pressure tank, and a discharge pipe connection for the pump means extending through the sump tank and communicating with the pressure tank through the pressure header connection.

15. A cabinet type actuator governor comprising a cabinet having a sump tank in the base thereof, pump and valve means supported on top of said tank inside the cabinet, the pump means drawing fluid directly from the tank and the valve means returning fluid directly into the tank, piping inside the tank interconnecting the valve and pump means, other piping extending through the tank from the valve means for connection through one wall of the tank with a fluid controlled prime mover, a compensating mechanism inside said cabinet over said base and operatively connected with the valve means, said mechanism including a restoring connection adapted to be extended downwardly through said sump tank base for connection with the fluid operated part of the prime mover controlled by said governor, and a conduit in said sump tank base in fluid tight relation with the walls thereof through which said restoring connection extends.

16. In a power plant governor installation, comprising in combination with a prime mover and a cabinet type actuator governor including a cabinet with a sump tank base over which governor compensating mechanism is mounted inside the cabinet, restoring connections between the prime mover and the governor compensating mechanism comprising, a flexible restoring cable, sheaves in spaced relation between the prime mover and actuator governor on which the cable is guided, sheave housings containing bearings for said sheaves and conduits interconnecting the sheave housings and having the cable extending therethrough, the conduits including an upper end conduit inside said sump tank base into which the cable is extended from the compensating mechanism, the low end of the system of conduits being closed by a packing gland through which the remote end of the cable extends in fluid tight relation therewith for connection with the prime mover, said system of conduits and sheave housings being substantially fluid tight and adapted to be filled with lubricant for lubrication of the cable and sheaves.

17. A governing unit for controlling the flow of fluid to and from a remotely located servo motor for regulating a prime mover, said unit comprising a hollow base providing a fluid sump, a housing enclosing said base, power actuated mechanism supported on said base and self-contained within said housing for placing fluid from said sump under a pressure regulated in response to speed changes of said prime mover, said mechanism including automatic compensating means, conduits extending through said sump downwardly from said base and providing fluid connections between said servo motor and said mechanism whereby the regulated fluid pressure is applied to the motor, and a mechanical connection also extending through said sump and transmitting the movements of said servo motor to said compensating means.

18. A governing unit for controlling the flow of fluid to and from a remotely located servo motor for regulating a prime mover, said unit comprising a hollow base providing a fluid sump, power actuated mechanism supported on said base and operable for withdrawing fluid from said sump and regulating the pressure thereof in response to speed changes of said prime mover, conduits extending through said sump and providing fluid connections between said servo motor and said mechanism whereby the regulated fluid pressure is applied to the motor, and a housing enclosing said base and said mechanism.

19. A system for governing a plurality of prime movers having, in combination, a plurality of fluid sumps, a common pressure header, a plurality of pressure tanks for supplying fluid under pressure to said header, pumps each operable to withdraw fluid from said sumps and delivering the same to said tanks, two independent governor actuated valves respectively controlling the flow of pressure fluid from said header to different servo motors, and selectively operable valve means by which one of said pumps and the associated sump and pressure tank may be isolated from the others while permitting the continued supply of pressure fluid from said header to said governor valves.

IRL C. MARTIN.
HELMER WALTER THORELL.